US009043867B2

(12) United States Patent
Uthmani et al.

(10) Patent No.: US 9,043,867 B2
(45) Date of Patent: May 26, 2015

(54) INFORMATION SHARING

(71) Applicant: The Court of Edinburgh Napier University, Edinburgh (GB)

(72) Inventors: Omair Uthmani, Edinburgh (GB); William Buchanan, Edinburgh (GB); Alistair Lawson, Edinburgh (GB); Lu Fan, Edinburgh (GB)

(73) Assignee: THE COURT OF EDINBURGH NAPIER UNIVERSITY (GB)

( * ) Notice: Subject to any disclaimer, the term of this patent is extended or adjusted under 35 U.S.C. 154(b) by 17 days.

(21) Appl. No.: 13/739,074

(22) Filed: Jan. 11, 2013

(65) Prior Publication Data
US 2014/0201804 A1    Jul. 17, 2014

(51) Int. Cl.
*G06F 21/00* (2013.01)
*G06F 21/60* (2013.01)
*G06F 21/55* (2013.01)
*G06F 21/62* (2013.01)
*H04L 29/06* (2006.01)

(52) U.S. Cl.
CPC .............. *G06F 21/60* (2013.01); *G06F 21/554* (2013.01); *G06F 21/6218* (2013.01); *H04L 63/101* (2013.01); *H04L 63/04* (2013.01); *H04L 63/10* (2013.01)

(58) Field of Classification Search
CPC ....................................................... H04L 29/06
USPC .................................................. 726/1, 5, 27
See application file for complete search history.

(56) References Cited

U.S. PATENT DOCUMENTS

| 6,138,238 A * | 10/2000 | Scheifler et al. ................ 726/17 |
| 6,651,096 B1 * | 11/2003 | Gai et al. ...................... 709/223 |
| 2009/0158030 A1 * | 6/2009 | Rasti ............................. 713/156 |
| 2014/0101203 A1 * | 4/2014 | Meunier et al. ............... 707/794 |

OTHER PUBLICATIONS

MacFarlane et al., Formal Security Policy Implementations in Network Firewalls, Computers and Security, 31 (2): 253-270 (2012).
International Search Report for PCT/GB2014/050042, 3 pages (mailed Mar. 24, 2014).
Written Opinion for PCT/GB2014/050042, 5 pages (mailed Mar. 24, 2014).

* cited by examiner

*Primary Examiner* — Jason Lee
(74) *Attorney, Agent, or Firm* — Choate, Hall & Stewart, LLP; Charles E. Lyon

(57) ABSTRACT

Systems and methods for the sharing of information between organizations are disclosed. Policies that govern the permissions for the sharing of information are represented as Boolean functions such as Binary Decision Diagrams.

16 Claims, 18 Drawing Sheets

INFORMATION SHARING

The present disclosure relates to improved information sharing and in particular to formal representations of information sharing policies between organizations.

An organization comprises various agents with different roles, which are represented by a form of organizational structure which may for example define a hierarchy of roles. Agents of an organization would normally be individual people although an agent may be a group of people, a software daemon, or a robot for example.

Organizations hold various items of information for example relating to activities of the organization. For various reasons it is desirable for organizations to collaborate and share information. However, organizations will generally not wish to share the entire corpus of information that they hold with another organization because of concerns regarding confidentiality, commercial sensitivity or other policy considerations such as data protection and human rights. There is a tension between the need for efficient information sharing on the one hand versus respecting these obligations and restrictions on the other.

An example of two organizations that have a need for efficient information sharing but in which there are sensitivities regarding the sharing of information would be a police department and a child protection department of a local city council. There is clearly a need in some cases for the police to have information about children under care so that various criminal investigations can be conducted. However, there is also a need from the perspective of a child protection department to ensure that their clients' confidentiality is maintained and that sensitive information is not given out to members of the police force who are not authorised or permitted to access the information. On the one hand, failure to share information could have serious consequences for the wellbeing of children under care and the protection of society but on the other hand sharing too much information could represent a serious civil abuse of confidentiality.

Similar considerations may apply to the sharing of information between any two organizations, be they in the public or private sector.

At present, policies for information sharing are based upon ill-defined permissions and rely upon subjective judgements being made by the owners of information as to whether a requestor has the appropriate authority to access the information they are requesting. Another problem comes when an owner of information faces requests from multiple different organizations. To use the example mentioned above, a child protection department may face requests for information from a variety of different police forces. However, the different police forces which request the information may have different organizational structures and/or use different job titles and/or have different rules associated with similar job titles. This makes it difficult for an owner of information to judge whether a specific request for information should be accepted or not.

SUMMARY OF THE INVENTION

According to a first aspect of the disclosure there is provided a method of defining a policy for the sharing of information between a requester organization and an information owner organization, wherein information held by the information owner organization is checked against the identity of an agent of the requester organization, and the definition of permitted access to particular types of information is represented by one or more Boolean functions.

Optionally, the identity of an agent of the requester organization comprises the role of the agent within an organizational hierarchy.

Optionally, said definition of permitted access to particular types of information also relies upon the role of an agent of the information owner organization.

Optionally, the Boolean functions are binary decision diagrams, most preferably reduced-order binary decision diagrams.

Optionally, fields of an information sharing policy are translated to bit sequences for forming Boolean vectors for representation as said binary decision diagrams.

Optionally, the fields of the policy are defined using a restricted natural language syntax.

Optionally, element identifiers are assigned to each element in each field. This means that fields of different lengths can be modelled.

According to a second aspect of the disclosure there is provided an information sharing policy defining rules for the sharing of information between a requester organization and an information owner organization, wherein the definition of permitted access to particular types of information is represented by one or more Boolean functions.

According to a third aspect of the present disclosure there is provided a non-transitory computer program product storing rules for the sharing of information between a requester organization and an information owner organization, wherein the definition of permitted access to particular types of information is represented by one or more Boolean functions.

According to a fourth aspect of the present disclosure there is provided a method of validating an information sharing policy defining rules for the sharing of information between a requester organization and an information owner organization, wherein the definition of permitted access to particular types of information is represented by one or more Boolean functions, the validating comprising performing one or more tests on said rules to check for errors.

Optionally, said one or more tests comprises testing for at least one selected from a group comprising: shadowing, correlation, generalization, redundancy.

According to a fifth aspect of the present disclosure there is provided a non-transitory computer program product comprising an application or other instruction set for validating an information sharing policy defining rules for the sharing of information between a requester organization and an information owner organization, wherein the definition of permitted access to particular types of information is represented by one or more Boolean functions, the validating comprising performing one or more tests on said rules to check for errors.

In one or more exemplary embodiments, the functions and configurations described may be implemented in hardware, software, firmware, or any combination thereof. If implemented in software, the functions can be stored on or transmitted over as one or more instructions or code on a computer program product, which may be stored on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

BRIEF DESCRIPTION OF THE DRAWINGS

The present disclosure will now be described by way of example only with reference to the accompanying drawings, in which.

DETAILED DESCRIPTION

The present disclosure relates to the concept of information sharing as a rule-based system. An advantage of this approach is that formal evaluation techniques can be applied to information-sharing policies and formal methods can be used to analyse these policies for errors and anomalies. A further advantage of the disclosure according to a preferred embodiment is that the linguistic intent of a rule can be maintained while still allowing for a structure that is sufficiently rigid so as to be applicable to formal analysis.

With any rule based system, the number of errors occurring within the rule-base increases with the number and complexity of the policies which govern system behaviour. Hence, with increasingly complex systems, which are gradually becoming more interconnected, the task of managing, auditing and deterministically predicting the effects of elaborate, inter-dependent policies becomes all the more demanding.

Figure 1:
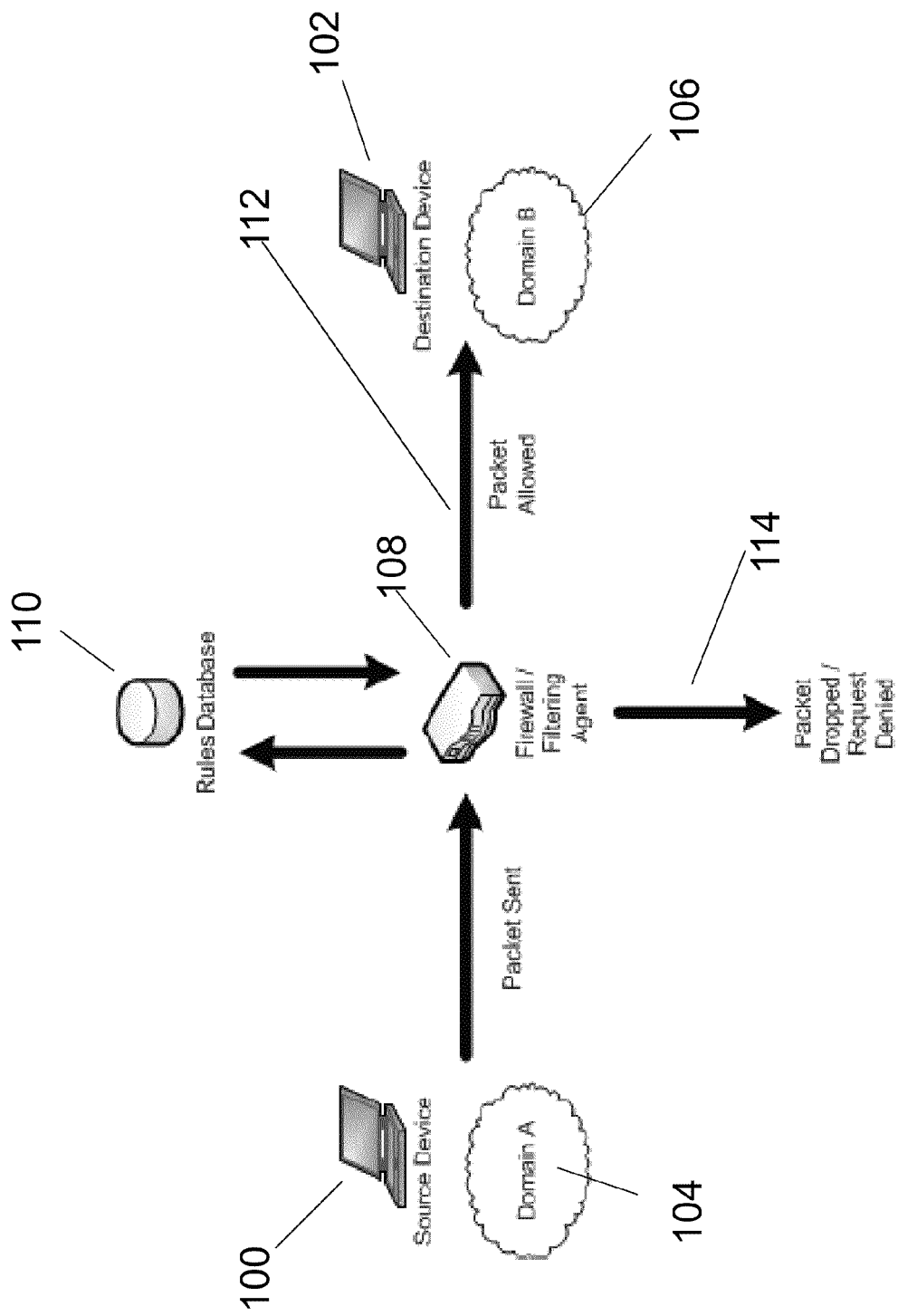
FIG. 1 illustrates the operation of a request filtering agent.

The inventors have realised that an analogy can be drawn between policy-based information sharing and rule-based packet-filtering firewall configuration, a simplified example of which is illustrated in FIG. 1. Here, communication between a source device 10 and the destination device 12 can be seen as similar to information to be shared between a first domain 14 and second domain 16. The sharing of information is governed by a filtering agent 18 which in the example of communication between computers 10, 12 would be a firewall. This filtering agent consults and acts in corporation with a rules database 110 so that transmission of a packet or a request for information can either be allowed (arrow 112) or denied (arrow 114). The allowance or denial of an information request according to an information sharing policy is alaogous in this context to the transmission or dropping of a packet according to a firewall's access control list. The function of the filtering agent 108 is to either permit or deny requests based on specified policies, just as a firewall would permit or deny a packet based upon its rules configuration.

This disclosure views mechanisms for sharing-information as policy-driven systems, where the sharing of information is driven by well-defined policies. This allows judgements to be made about the behaviour of the system based on the analysis of its policies, as the system's behaviour will be deterministic. Further, where a system has a large corpus of policies governing its behaviour, the use of a well-defined policy structure allows such a corpus to be managed efficiently. Policies may be defined as the principles governing the decisions undertaken within a system which affect the behaviour of the system. Hence, policies can be said to play a central role in governing the behaviour of a system.

However, there is a need to separate high-level policy definitions from low-level policy implementations. This separation process presents two fundamental challenges:
1. The high-level policy should be human-readable so that it is able to effectively capture the intention of the policy originator.
2. The translation of high-level definitions to low-level implementations must be explicit, unambiguous and deterministic.

Existing approaches seeking to address these challenges have not been designed from the perspective of the policy originator, but that of the lower-level policy implementer. Hence, these approaches invariably require significant proficiency and expertise of the lower-level policy implementation mechanisms before they can be used effectively. This presents a further challenge from an information-sharing perspective. Practitioners such as law-enforcement officers, social-workers and health professionals, usually do not readily possess this expertise.

Yet their roles involve responsibilities that are subject to, and require everyday interaction with, such policies.

The present disclosure addresses this by approaching high-level policy syntax from a restricted natural-language perspective. By using natural-language for high-level definitions, the task of interpreting the aim of policy statements becomes intuitive and accessible to practitioners. This approach may be used in order to effectively capture the goals of the policy, as intended by the policy originator. A natural-language approach allows a high-level policy statement to be human-understandable and allows non-experts to read a policy statement and easily understand the intent of the policy originator.

One considerable obstacle with the use of free-form natural-language is that a statement can have different meanings and interpretations which make it unsuitable for strict policy definition. Even carefully written natural language specifications are ambiguous and open to interpretation. Therefore, in order to address this obstacle, this disclosure uses a restricted natural-language syntax, developed specifically for information-sharing scenarios, which allows clear, explicit and human-readable policy definitions while avoiding any ambiguity in policy interpretation or translation.

Filtering agent rules can be thought of as the lower-level implementation of higher-level network security policies which define which packets should be permitted or denied by the network.

Firewall rules are used to implement these policies and usually include a number of essential components based on packet header fields, such as protocol-type, source IP address, source port, destination IP address, and destination port and so on, in order to classify packets. When a packet matches a rule, the decision to permit or deny it is defined by the action component of the rule. Usually, a number of firewall rules, structured in sets called access control lists (ACLs), are needed to effectively implement security policies. If no matching rules are found, the firewall will use a default, usually deny, action.

For simplicity, this disclosure focuses on the following fields:
Protocol: This identifies the protocol of the packet. For simplicity, this disclosure focuses on the Transmission Control Protocol (TCP) and User Datagram Protocol (UDP).
Source IP address: This is made up of the standard IP address segments, each segment consisting of a binary octet represented in decimal by a number in the range 0 to 255.
Source Port: This defines a port number in Internet Protocol (IP) suite, ranging from 0 to 65535.
Destination IP address: This follows the same format as the Source IP address.
Destination Port: This follows the same format as the Source Port number.
Action: This defines the action that the firewall must take, accept or reject, when a packet matches the defined rule.

Integers from the above firewall rule fields can be represented as bit vectors and, hence, as variables of Binary Decision Diagrams (BDDs). For example, a firewall rule which denies TCP packets from source port 80 of the IP address 140.192.37.20, destined for port 21 of IP address 192.168.21.20, could be of the form "TCP 140.192.37.20 80 192.168.21.20 21 Deny"

A restricted natural-language syntax has been developed specifically for information sharing scenarios. This syntax makes use of firewall policy rules as set out in the following syntax:
<rule order><protocol><source ip><source port><destination ip><destination port><permission>

This syntax comprise '5-tuples', where each tuple is a required field in the header of a packet and is used by a packet-filtering firewall to determine how the packet should be handled. Similarly, using the analogy illustrated in FIG. 1 where a packet is compared to a request for information and a firewall is compared to a request filtering agent, a generic information-sharing rule syntax is developed based on fields outlined as:
<permission><requester><relationship><action>
<attribute><object><context><owner><compliance>

A simple information-sharing rule can, therefore, be reduced to a nine field syntax where the contents of these fields may be defined as:
<permission> is part of the rule syntax which indicates the action of the rule. This defines whether a request meeting the rule criteria will be permitted or denied access.
<requester> identifies the source of a request as a specific individual or the membership of a certain role.
<relationship> defines the relationship which exists between a requester and an owner with respect to an object.
<action> defines the action a requester is permitted to perform on an object attribute, such as create, read, update or delete.
<attribute> is a unit of information describing an object.
<object> refers to any entity about which information is held.
<context> identifies the reason why the information is being shared. The context also governs the level of access and permissions associated with information exchange and, hence, impacts the priority accorded to information requests.
<owner> species a role with sufficient privileges to manage all aspects of an information element. The owner has the authority to allow or deny access to an information element, as required by legislation and defined responsibilities.
<compliance> refers to legislative requirements that affect the exchange of information, as well as data anonymisation and sanitisation requirements.

Information-sharing policies can, therefore, be generalised and reduced to be defined using a nine-field syntax, as outlined above. Each rule represented using this syntax may be thought of as a higher level information-sharing policy. Integers from a specific field can be represented as bit vectors and, hence, as variables in Binary Decision Diagrams (BDDs). As outlined earlier, a policy in a rule-based system such as a firewall which denies TCP packets from source port 80 of the IP address 140.192.37.20, destined for port 21 of IP address 192.168.21.20, could be of the form of: "TCP 140.192.37.20 80 192.168.21.20. 21 Deny".

Similarly, in an information-sharing scenario, a policy could exist between the Domestic Violence Unit of Police Force 'A' and the Records Unit of Child Protection Agency 'B'. In this example, the policy permits the chief-investigator of a child-protection investigation to read the health history record of a child. The health history record is maintained by the Records Unit of Child Protection Agency 'B' and needs the approval of that unit's Records Admin before it can be shared.

Further, the policy additionally stipulates that the investigator must be of the rank of Sergeant within the Domestic Violence Unit of Police Force 'A' and that the request for information must be in compliance with the Data Protection Act. This policy initially appears complex but can be effectively modelled using the syntax outlined above. The result is illustrated as:
This policy <permits> a <Sergeant> from the <Domestic Violence Unit> of <Police Force 'A'>, with a <Chief Investigator> relation in a <Child Protection Investigation>, to request to <read> a <child's><Health History Record> from the <Records Admin> of the <Records Unit> of <Child Protection Agency 'B'> under compliance of the <Data Protection Act>
where the '<' and '>' symbols denote the beginning and end, respectively, of a relevant field in the policy.

As mentioned above, the present disclosure makes use of Boolean logic in the representation of an information sharing policy. The classical calculus definitions for Boolean expressions comprise Boolean variables (x, y, . . . ), constants, true (1) and false (0), and operators negation (¬), conjunction (^), disjunction (∨), implication (⇒) and bi-implication (⇔). Truth tables illustrating the function of these operators are shown below.

TABLE 1

Truth table for the negation (¬) Boolean operator.

| Input p | Output ¬p |
|---|---|
| 0 | 1 |
| 1 | 0 |

TABLE 2

Truth table for the conjunction (∧) Boolean operator.

| Input p | Input q | Output p∧q |
|---|---|---|
| 0 | 0 | 0 |
| 0 | 1 | 0 |
| 1 | 0 | 0 |
| 1 | 1 | 1 |

TABLE 3

Truth table for the disjunction (∨) Boolean operator.

| Input p | Input q | Output p∨q |
|---|---|---|
| 0 | 0 | 0 |
| 0 | 1 | 1 |
| 1 | 0 | 1 |
| 1 | 1 | 1 |

TABLE 4

Truth table for the implication (⇒) Boolean operator.

| Input p | Input q | Output p⇒q |
|---|---|---|
| 0 | 0 | 1 |
| 0 | 1 | 1 |
| 1 | 0 | 0 |
| 1 | 1 | 1 |

TABLE 5

Truth table for the bi-implication (⇔) Boolean operator.

| Input p | Input q | Output p⇔q |
|---|---|---|
| 0 | 0 | 1 |
| 0 | 1 | 0 |
| 1 | 0 | 0 |
| 1 | 1 | 1 | p⇔q ≡ (p∧q)∨(¬p∧¬q)

It should be noted that the expression (p⇒q), as denoted in Table 4, is logically equivalent to the expression (¬p∨q). Further, it should also be noted that the expression (p⇔q), as denoted in Table 5, is logically equivalent to the expression ((p^q)∨(¬p^¬q)).

Binary Decision Diagrams (BDDs) are rooted, directed, acyclic representations of Boolean functions. BDDs originate from binary decision trees which are rooted, directed trees that can be used to represent Boolean functions.

Figure 2:
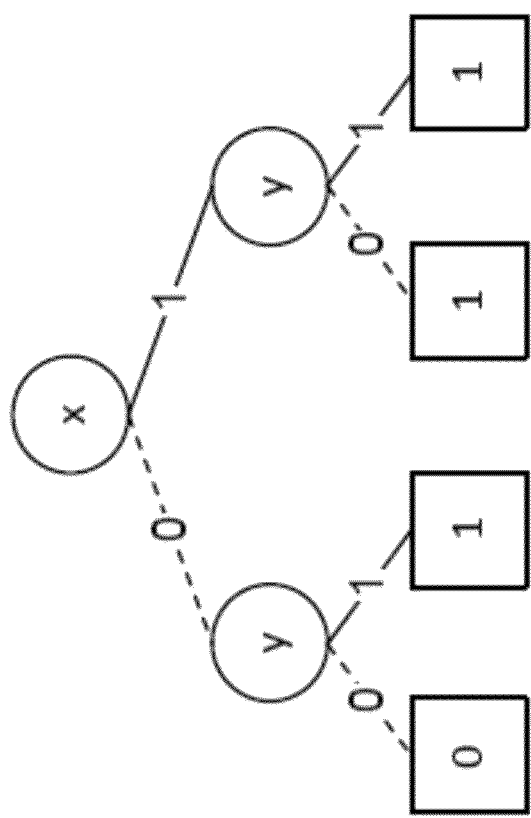
FIG. 2 shows a binary decision diagram for the function $f(x, y)=(x \vee y)$.

For example, the decision tree illustrated in FIG. 2 represents the Boolean function f(x,y)=(x∨y). The concept behind this form of representation is that each non-terminal node (circle) in the decision tree denotes a variable. In the example illustrated in FIG. 2, the variables are x and y. The node refers to a test of the variable's binary value, 0 or 1, with the edges of the node representing the paths taken by either possible value. The path represented by the dashed (low) edge corresponds to the case where the variable is assigned a 0, and the path represented by the solid (high) edge corresponds to the case where the variable is assigned a 1. The bottom (square) terminal-nodes of the tree represent the Boolean constants 0 and 1. Hence, the value of any Boolean function may be evaluated for any given number of variables by starting at the root (top) of the tree and following the path at each node, as determined from the value of the variable that the node represents. This process is repeated until a terminal-node (bottom) is reached. The value of the Boolean function, either a 0 or a 1, is represented by the value of the terminal node.

Figure 3:
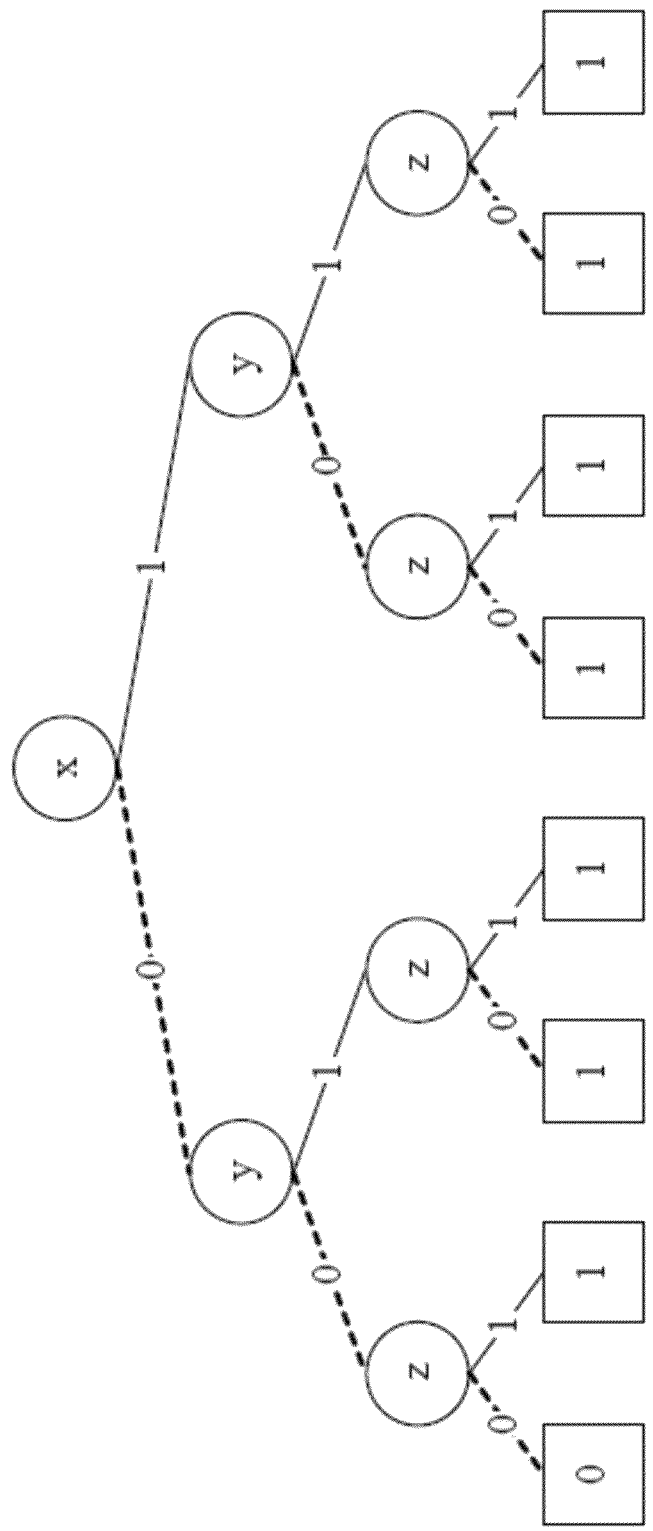
FIG. 3 shows a binary decision diagram for the function $f(x, y, z)=(x \vee y \vee z)$.

If the function being represented contains a large number of variables, then the decision tree representing that function will also be very large. FIG. 3, for example, represents the binary decision tree for the function f(x, y, z)=(x∨y∨z). A comparison of FIG. 2, which represents a Boolean function with two variables, x and y, with FIG. 3, which represents a Boolean function with three variables, x, y, and z, illustrates that there is an exponential relationship between the number of variables in the function and the number of nodes in the decision tree which represents that function. With increasing numbers of variables, therefore, the size of the decision trees used to represent functions increases exponentially. As can be expected, the decision trees of complex Boolean functions can quickly become very large and difficult to use.

Figure 4:
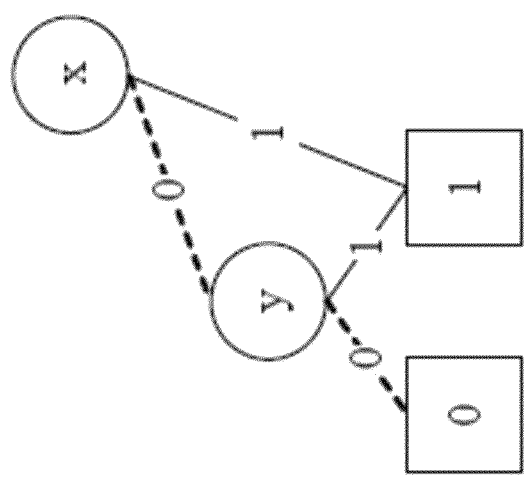
FIG. 4 shows a reduced order binary decision diagram for the function of FIG. 2.
Figure 5:
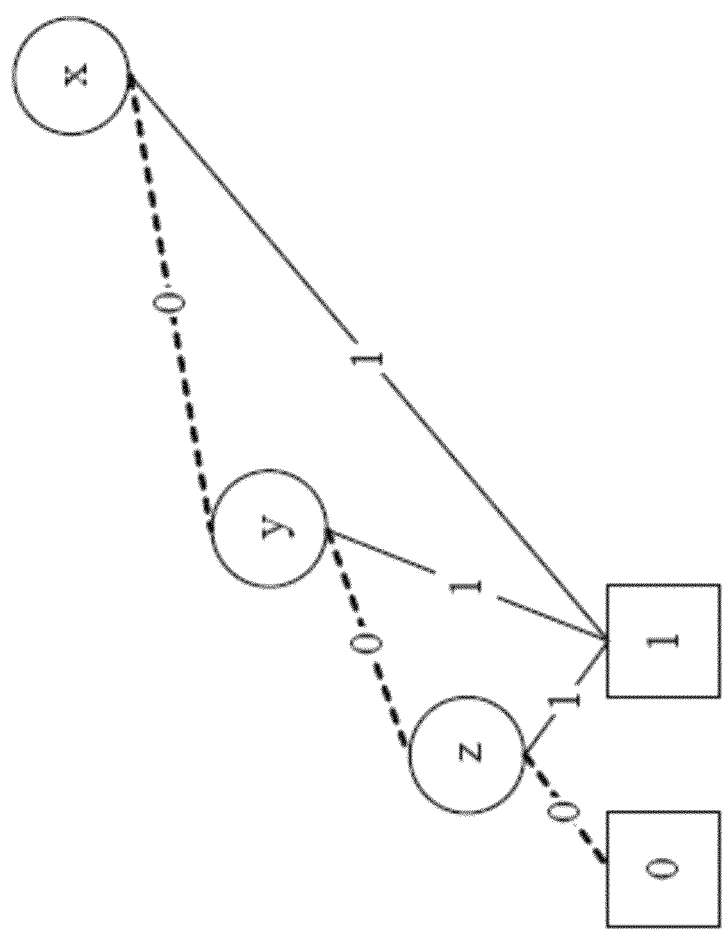
FIG. 5 shows a reduced order binary decision diagram for the function of FIG. 3.

This can be addressed with so-called reduced ordered BDDs. The process of reduction consists of merging any isomorphic sub-graphs for the decision tree. Any parent node which has child-nodes that are isomorphic is considered redundant and is removed. Applying this process to the decision tree for the Boolean function f(x,y)=(x∨y), as illustrated in FIG. 2, it is evident that if the first node, x, is 1, then the value of the second node, y, has no effect on the terminal node value of the Boolean function: whether y is 0 or 1, the value of the terminal nodes is 1. This means that the where node x is 1, child-nodes of y are isomorphic. Node y can then be considered redundant here and removed. The result is the reduced decision tree illustrated in FIG. 4. Similarly, applying the reduction process to the decision tree for the Boolean function f(x, y, z)=(x∨y∨z), illustrated in FIG. 3, yields the reduced decision tree shown in FIG. 5. Reduced decision trees allow a much more compact representation of Boolean expressions than non-reduced decision trees.

Figure 6:
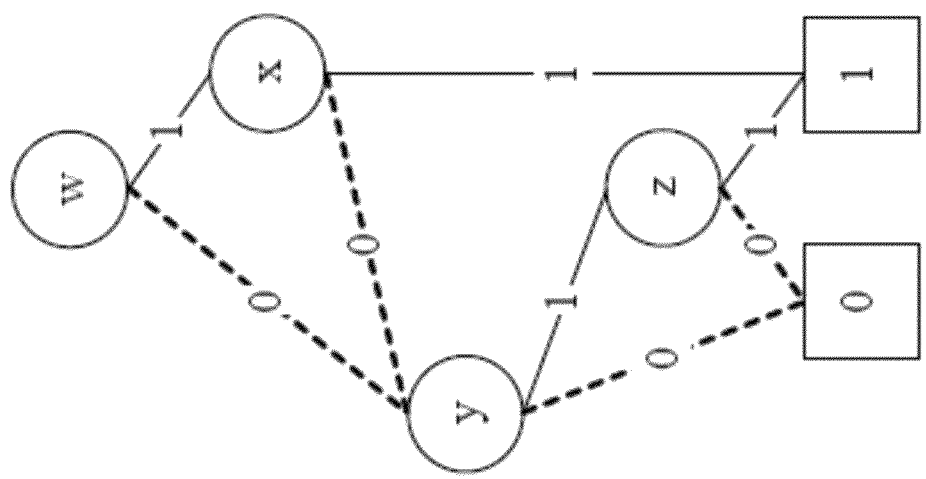
FIG. 6 shows a reduced order binary decision diagram for the function $f(w, x, y, z)=(w \hat{} x) \vee (y \hat{} z)$ with variable ordering of w, x, y, z.
Figure 7:
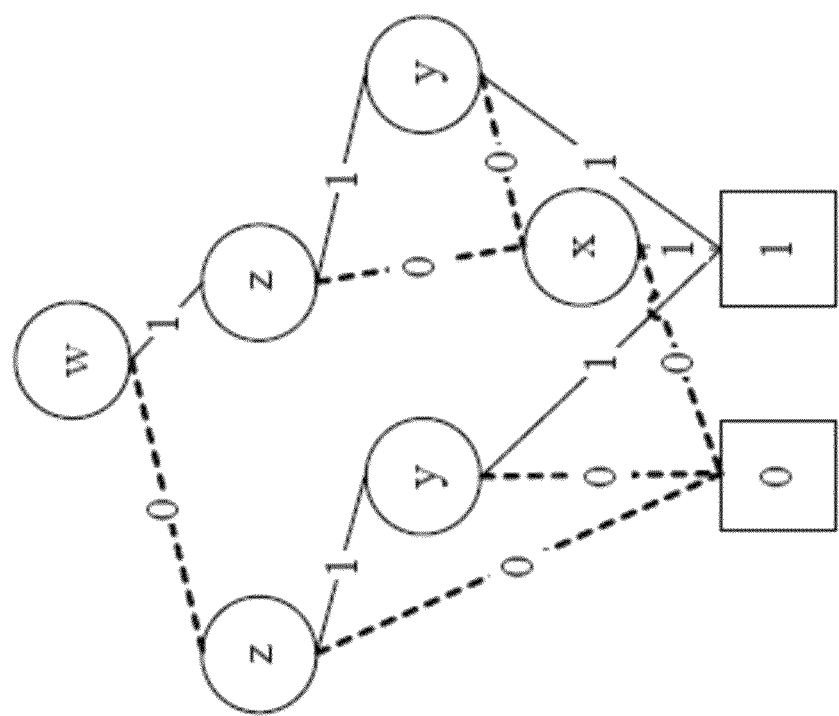
FIG. 7 shows a reduced order binary decision diagram for the function of FIG. 6 with variable ordering of w, z, y, x.

The size of a decision tree for a given function is dependent on the ordering of the variables in that decision tree. For example, the decision tree for the Boolean function f(w, x, y, z)=(w^x)∨(y^z), given a variable ordering of w, x, y, z, is illustrated in FIG. 6. If the variable ordering for the same function was now changed to w, z, y, x, the resultant decision tree will be more complicated, as illustrated in FIG. 7. Hence, an optimal variable ordering will produce the simplest, and therefore smallest, decision tree for a given function, while sub-optimal orderings will produce larger and more complex decision trees for the same function. However, determining the optimal variable ordering for a Boolean function is an NP-complete problem that often requires trial and error or expert knowledge of domain-specific ordering strategies.

Decision trees which have been reduced and ordered are referred to as Reduced Ordered Binary Decision Diagrams (ROBDDs), or commonly shortened to just Binary Decision Diagrams (BDDs). A key property of the reduction and ordering restrictions is that the resulting BDDs are canonical. This means that the BDD for any Boolean function, for a defined variable ordering, will always be isomorphic, making them useful for formal equivalence checking.

The present disclosure exploits the unique properties of Binary Decision Diagrams (BDD) to model complex sets of policies, in a form that is readily machine-executable, and to extend these to the information-sharing domain. A set of information sharing policies is mapped to key constituent fields and translated these into bit vectors representing BDD variables, once a specific variable ordering scheme has been selected.

The modelling of a set of policies as a BDD provides a number of significant advantages, including providing an efficient lookup mechanism for an information-sharing request as well as providing a graphical representation of the overall policy set, if required. As rule sets become larger and more complex, they become difficult to interpret and maintain. Modification of the rule set, by either adding new rules or removing existing ones, or even changing the order of rules has a significant impact on the behaviour of the policy-based system. Hence, analysis and validation of large, complex rule sets is important in ensuring that high-level directives are enforced. Further, exploiting the formal equivalence checking ability of BDDs, and the fact that they can canonically represent Boolean functions, multiple sets of policies can be compared to ensure that they have the same behaviour or identify areas where they behave differently. Large and complex rule sets, represented as BDDs, can, therefore, be efficiently modelled, analysed and validated.

Starting from firewall rules, each field in the rule may be first translated into a bit sequence in order to be represented as a BDD. The following list describes how firewall rule fields for the example mentioned above are translated into bit sequences:

Protocol: Only one Boolean variable is needed to represent this field since it can only be either TCP or UDP. TCP will be denoted by 1 and UDP by 0.

Source IP address: The source IP address field consists of four binary octets represented in decimal by a number in the range 0 to 255 and, hence, requires 32 Boolean variables to translate to bit sequence. The four octets of the source IP address in the example, 140.192.37.20, are translated as follows:
140: 1000 1100
192: 1100 0000
37: 0010 0101
20: 0001 0100

Source port: The source port field represents ports ranging from 0 to 65535, hence, 16 Boolean variables are required to translate this field. The source port field in the example, port 80, is translated as 0000 0000 0101 0000.

Destination IP address: The destination IP address field has the same format as the Source IP address field and also requires 32 Boolean variables. The four octets of the destination IP address in the example, 192.168.21.20, are translated as follows:
192: 1100 0000
168: 1010 1000
21: 0001 0101
20: 0001 0100

Destination port: The destination port field has the same format as the source port field and also requires 16 Boolean variables. The destination port field in the example, port 21, is translated as 0000 0000 0001 0101.

Action: The action field can either be 'Permit', denoted by 1, or 'Deny', denoted by 0.

The firewall rule can, hence, be translated into a Boolean vector of 97 variables and, therefore, be represented as a BDD. Similarly, the process used to convert a single firewall rule into a Boolean function, shown above, can be recursively applied to all the rules in a rule set. The resulting Boolean functions corresponding to each individual rule can then be linked together using a logical disjunction operator ($\vee$) for permit rules or a logical conjunction ($\wedge$) operator for deny rules, yielding a single Boolean function which represents the entire firewall rule set. This function can then be represented as a BDD which models the complete rule set. A firewall can then classify and filter packets using the BDD by simply extracting relevant fields in the packet header and checking if they satisfy the BDD.

This concept can be applied to information sharing policies. Each field in an information-sharing policy is first translated into a bit sequence in order to be represented as a BDD. The following list describes how policy fields for the example shown above are translated into bit sequences:

Permission: A single Boolean variable is needed to represent this field since it can either be 'permit' and denoted by 1, or 'deny' and denoted by 0.

Requester, Owner: The Requester field, similar to the Owner field, comprises a hierarchical, LDAP-inspired form. It can be tailored to any organisational hierarchy but, for the purposes of illustration, represents a 'Domain.Organisation.Unit.Role' structure in this example, representing the respective fields for the Requester and Owner. Since this simplified example has a single Requester and a single Owner, two binary variables are needed to represent the domain, organisation, unit and roles of each:
Requester Domain: 01
Requester Organisation: 01
Requester Unit: 01
Requester Role: 01
Owner Domain: 10
Owner Organisation: 10
Owner Unit: 10
Owner Role: 10

Relation: The relation field is represented as 'flat' in this example, solely for illustration. Since this example contains only one relation, it is simply represented by a single '1'. In a 'live' system, this field will usually be hierarchically defined to reflect the desired granularity. The structure and specific hierarchy used for the definition of this field is entirely flexible and can be tailored to the needs of the organisation.

Context: Similar to the relation field described above, the context field is also represented as 'flat' in this example, solely for illustration. Since this example contains only one context, it is simply represented by a single '1'. In a 'live' system, this field will also be defined in a hierarchical fashion to reflect desired granularity. The structure and specific hierarchy used for the definition of this field is entirely flexible and can be tailored to the needs of the organisation.

Action: The action field is used to differentiate between possible actions, such as create, read, update and delete, which a requester may be allowed to perform. Since this example contains the 'Read' action, it is simply represented by a single '1'.

Object: Similar to the relation field described above, the object field is also represented as 'flat' in this example, solely for illustration. Since this example contains only one object, it is simply represented by a single '1'. In a 'live' system, this field will also be defined in a hierarchical fashion to reflect desired granularity. The structure and specific hierarchy used for the definition of this field is entirely flexible and can be tailored to the needs of the organisation.

Attribute: Similar to the relation field described above, the attribute field is also represented as 'flat' in this example, solely for illustration. Since this example contains only one attribute, it is simply represented by a single '1'. In a 'live' system, this field will also be defined in a hierarchical fashion to reflect desired granularity. The structure and specific hierarchy used for the definition of this field is entirely flexible and can be tailored to the needs of the organisation.

The information-sharing policy shown in the example above can, hence, be translated into a Boolean vector of 97 variables, shown as:
<permission=1><requester=01010101><relationship=1> <action=1><attribute=1><object=1><context=1><owner= 10101010><compliance=1>

Since the policy is now in a Boolean vector form, it can be represented as a BDD.

Similarly, the process used to convert a single information sharing rule into a Boolean function, shown above, can be recursively applied to all the rules in a rule set. The resulting Boolean functions corresponding to each individual rule can then be linked together using a logical disjunction operator (∨) for permit rules or a logical conjunction (^) operator for deny rules, yielding a single Boolean function which represents the entire set of policies. This function can then be represented as a BDD which then models the entire policy set. The policy-filtering agent can then classify and filter information using the BDD by simply extracting relevant fields described above and checking if they satisfy the BDD.

We will now consider an example describing the steps that may be carried out to translate a set of information-sharing policies to a BDD.

An example set of policies may be as follows:

Policy 1: This policy <permits><ANY> requester, with <ANY> relation in <ANY> context, to request to <read> a <child's><Health History Record> from the <Records Admin> of the <Records Unit> of <Child Protection Agency 'B'> under compliance of the <Data Protection Act>

Policy 2: This policy <denies> a <Sergeant> from the <Domestic Violence Unit> of <Police Force 'A'>, with <ANY> relation in <ANY> context, to request to <read> a <child's><Case File Record> from <ANY> owner under compliance of the <Data Protection Act>

Policy 3: This policy <denies><ANY> requester, with <ANY> relation in <ANY> context, to request to <read> a <child's><Case File Record> from <ANY> role of the <Records Unit> of <Child Protection Agency 'B'> under compliance of the <Data Protection Act>

Policy 4: This policy <permits><ANY> role from the <Domestic Violence Unit> of <Police Force 'A'>, with <ANY> relation in <ANY> context, to request to <read> a <child's><Case File Record> from <ANY> owner under compliance of the <Data Protection Act>

A or 'Any' is used to denote redundant fields, or redundant portions of fields.

Redundant fields are not translated into binary as they represent variables that are not evaluated by the BDD and, hence, do not form part of the Boolean function. Where an entire field is redundant, it is entirely excluded from the binary representation and where only a portion of a field is redundant, only the relevant portion is translated while the redundant portions are shown using 'Xs'.

Policy 1
   Compliance (DPA): 1
   Requester (Any): not checked by BDD
   Relation (Any): not checked by BDD
   Context (Any): not checked by BDD
   Object (Child): 1
   Attribute (Health History Record): 01
   Owner (SocCare.CPA-B.
   RecUnit.RecAdmin): SocCare: 10
     : CPA-B: 10
     : RecUnit: 10
     : RecAdmin: 10
   Action (Permit): 1

The Boolean function corresponding to Policy1, ignoring redundant fields, is a logical conjunction of all of the above fields in the following format:
Permit: Compliance^Owner^Object^Attribute The following represents Policy1 expressed logically as an 'if-then' conditional statement:
   if (Compliance=1)^
     (Owner=10101010)^
     (Object=1)^
     (Attribute=01),
   then (Action=Permit)

Figure 8:
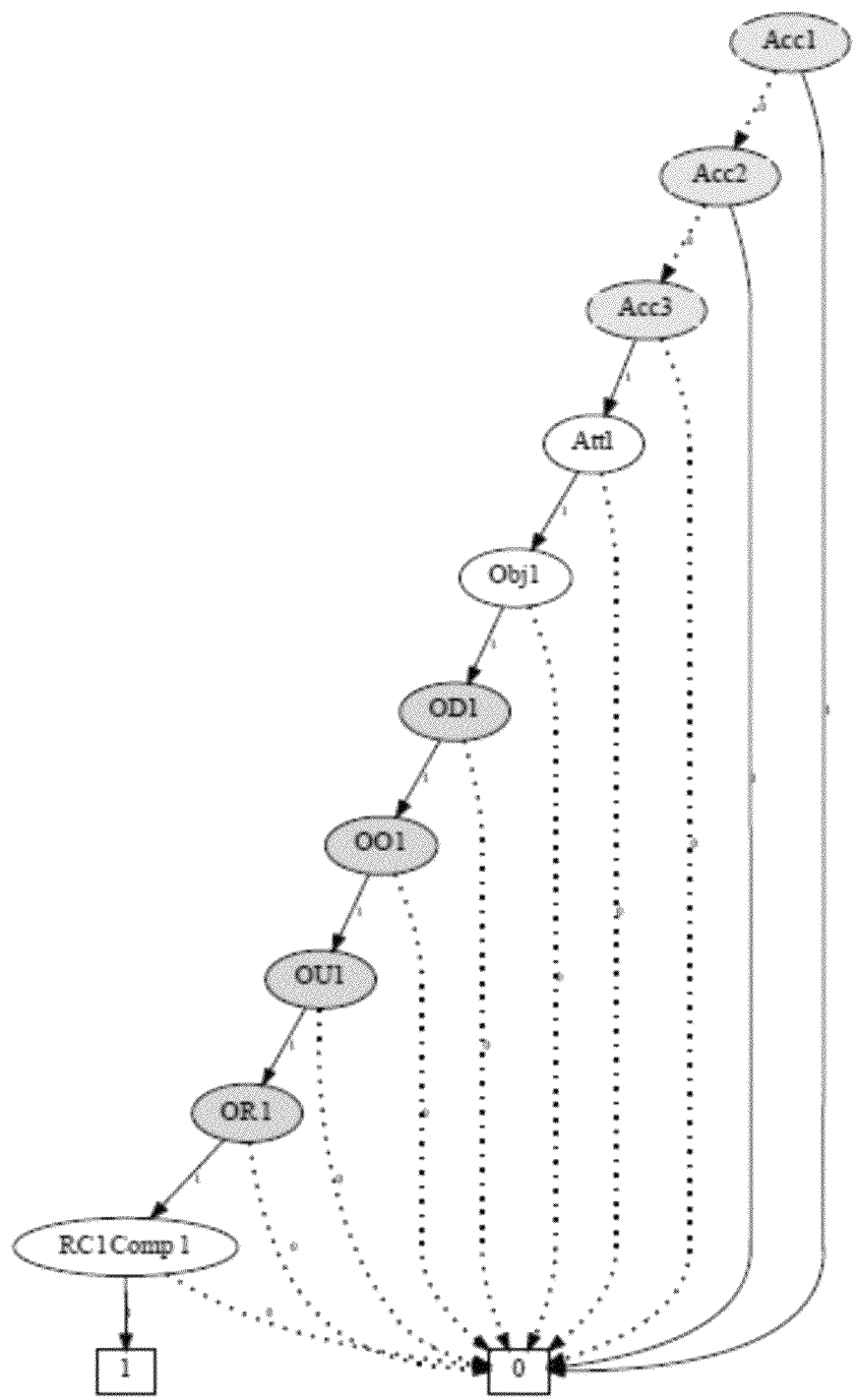
FIGS. 8-15 show binary decision diagrams representing various example rules of an information sharing policy.
Figure 9:
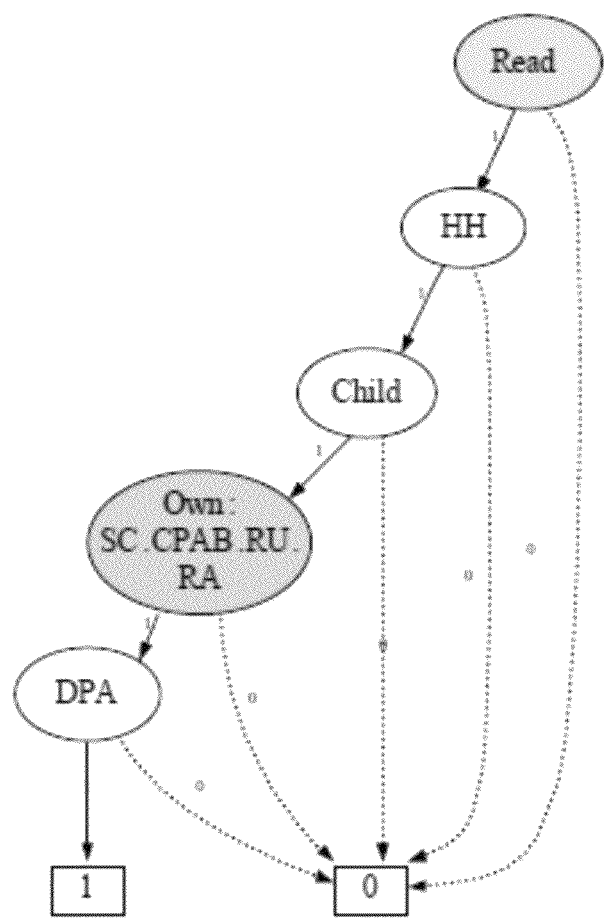

FIG. 8 illustrates Policy1 as a BDD. FIG. 9 represents a simplification of FIG. 8, highlighting the effective constituent parts of Policy1.

Policy2
   Compliance (DPA): 1
   Requester (Police.Force-A.DVU.Sergeant): Police: 01
     : Force-A: 01
     : DVU: 01
     : Sergeant: 01
   Relation (Any): not checked by BDD
   Context (Any): not checked by BDD
   Object (Child): 1 Attribute
   (Case File Record): 10 Owner
   (Any): not checked by BDD
   Action (Deny): 0

The Boolean function corresponding to Policy2, ignoring redundant fields, is a logical conjunction of all of the above fields, in the following format:
Deny: Compliance^Requester^Object^Attribute The following then represents Policy2 expressed logically as an 'if-then' conditional statement:
   if (Compliance=1)^
     (Requester=01010101)^
     (Object=1)^
     (Attribute=10),
   then (Action=Deny)

Figure 10:
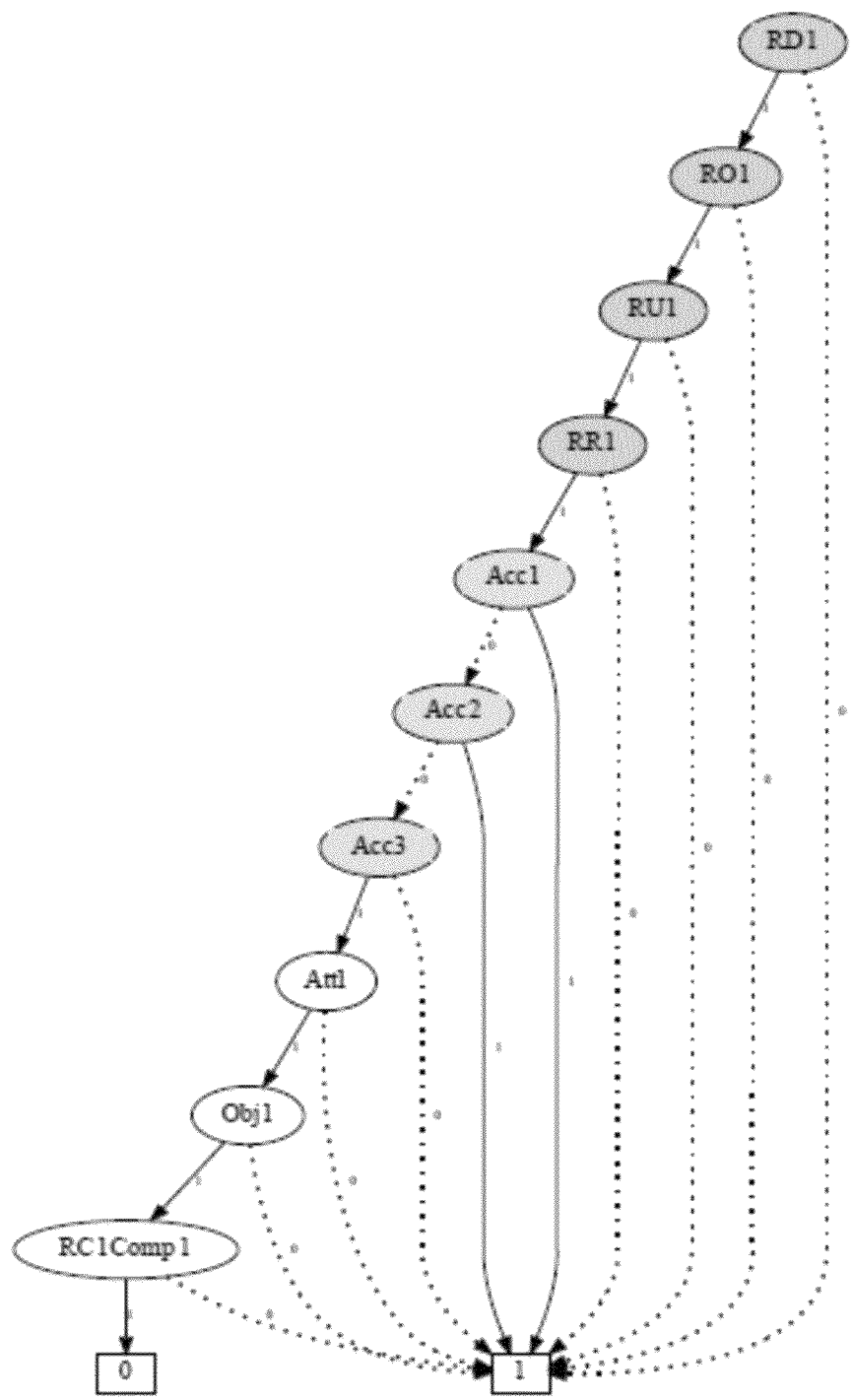
Figure 11:
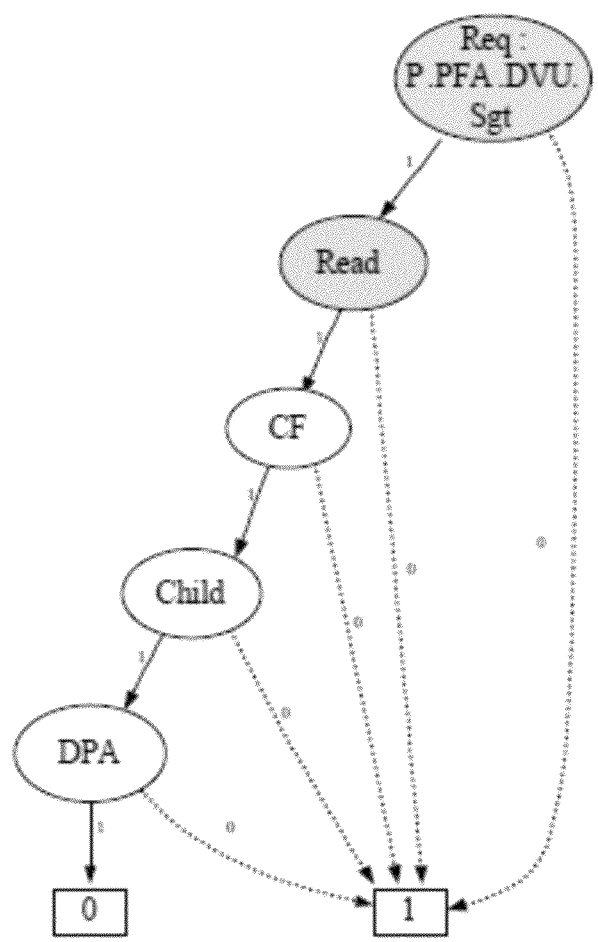

FIG. 10 illustrates Policy2 as a BDD. FIG. 11 represents a simplification of FIG. 10, highlighting the effective constituent parts of Policy2.

Policy3
   Compliance (DPA): 1
   Requester (Any): not checked by BDD
   Relation (Any): not checked by BDD
   Context (Any): not checked by BDD
   Object (Child): 1
   Attribute (Case File Record): 10
   Owner (SocCare.CPA-B.RecUnit.Any): SocCare: 10
     : CPA-B: 10
     : RecUnit: 10
     : Any: X
   Action (Deny): 0

The Boolean function corresponding to Policy3, ignoring redundant fields, is a logical conjunction of all of the above fields, in the following format:

Deny: Compliance^Owner^Object^Attribute

The following then represents Policy3 expressed logically as an 'if-then' conditional statement:

if (Compliance=1)^
   (Owner=101010×)^
   (Object=1)^
   (Attribute=1),
then (Action=Deny)

Figure 12:
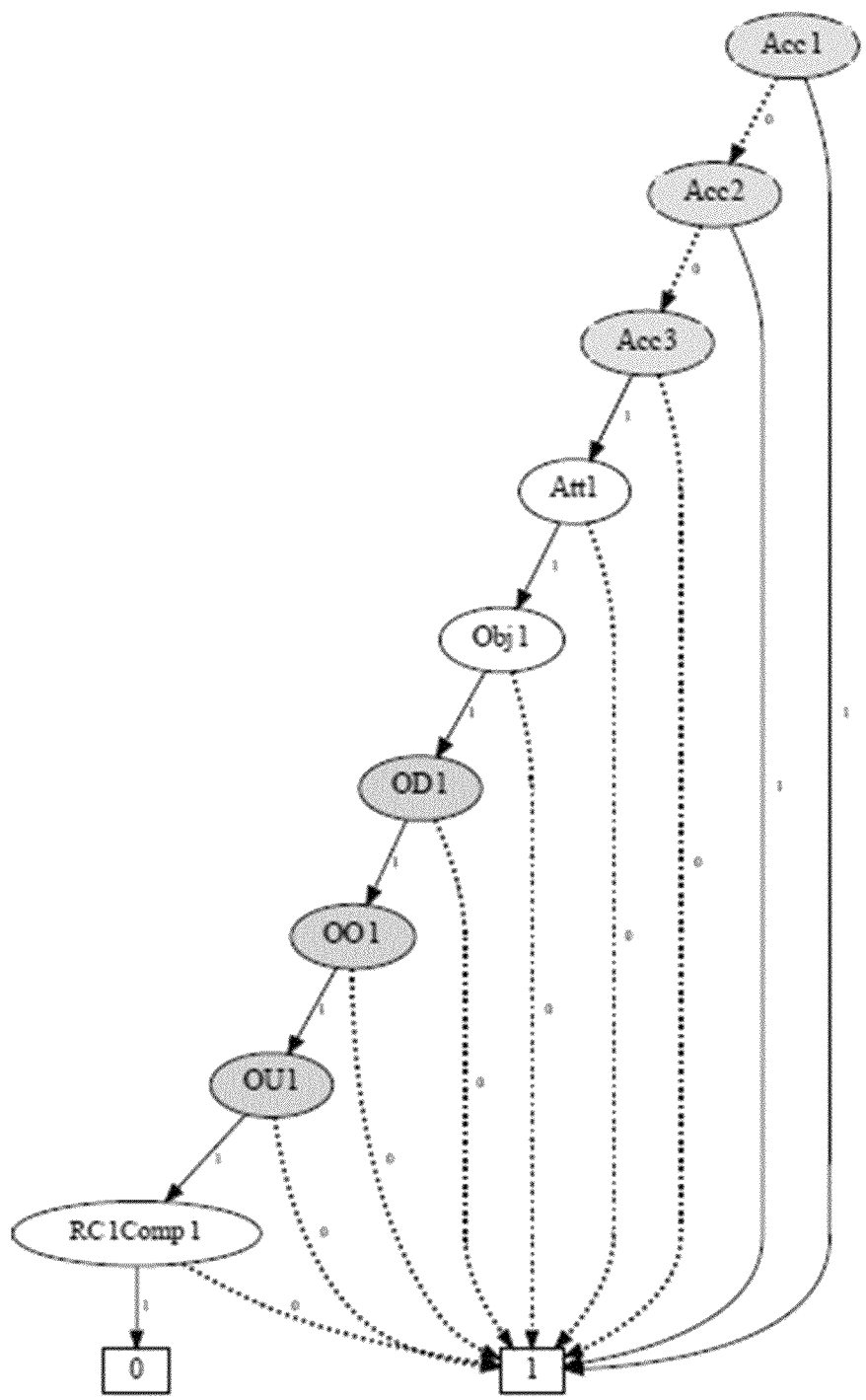
Figure 13:
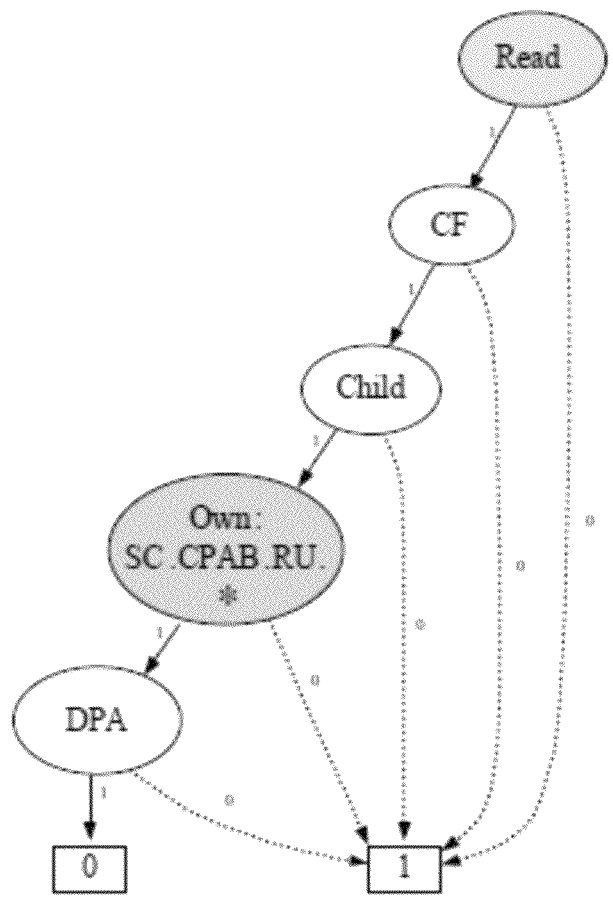

FIG. 12 illustrates Policy3 represented as a BDD. FIG. 13 represents a simplification of FIG. 12, highlighting the effective constituent parts of Policy3.

Policy4
   Compliance (DPA): 1
   Requester (Police.Force-A.DVU.Any): Police: 01
     : Force-A: 01
     : DVU: 01
     : Any: X
   Relation (Any): not checked by BDD
   Context (Any): not checked by BDD
   Object (Child): 1
   Attribute (Case File Record): 10
   Owner (Any): not checked by BDD
   Action (Permit): 1

The Boolean function corresponding to Policy4, ignoring redundant fields, is a logical conjunction of all of the above fields, in the following format:

Permit: Compliance^Requester^Object^Attribute

The following then represents Policy4 expressed logically as an 'if-then' conditional statement:

if (Compliance=1)^
   (Requester=010101X)^
   (Object=1)^
   (Attribute=10),
then (Action=Deny)

Figure 14:
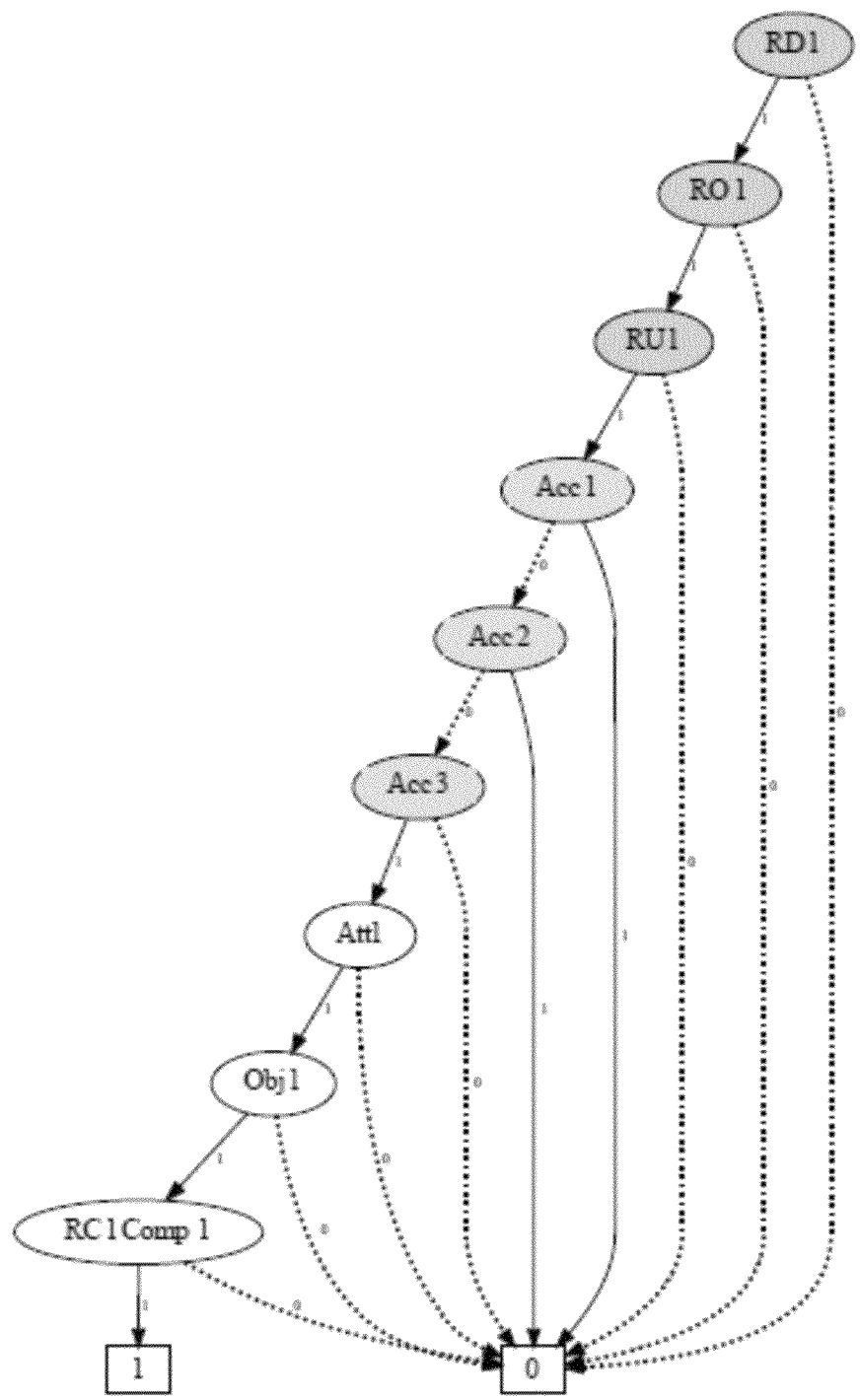
Figure 15:
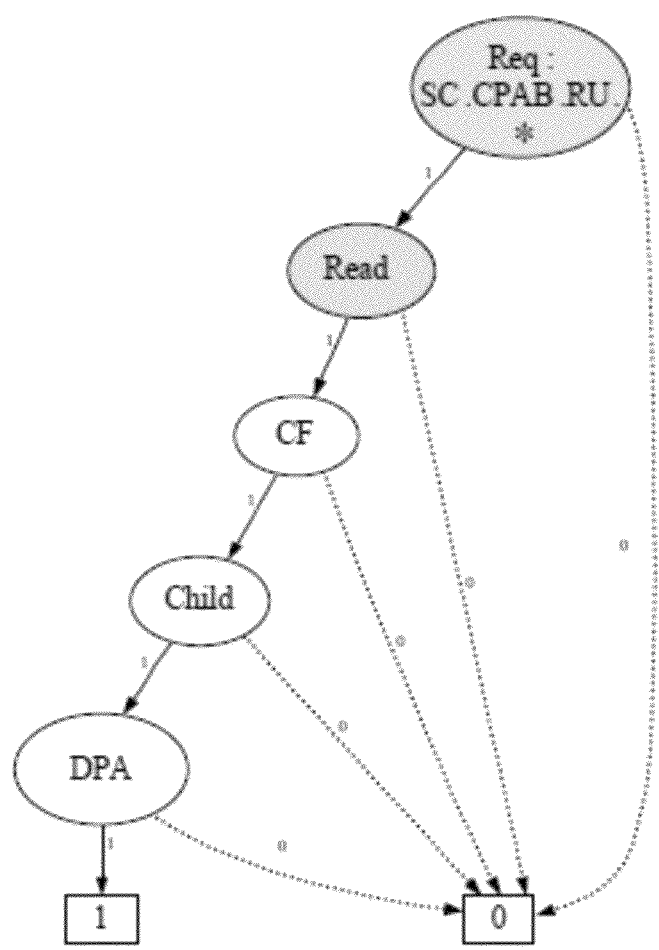

FIG. 14 illustrates Policy4 represented as a BDD. FIG. 15 represents a simplification of FIG. 14, highlighting the effective constituent parts of Policy4.

The information-sharing policy modelled by the sample list shown above is enforced through a combination of Policy1, Policy2, Policy3 and Policy4. The logical sequence in which the rules are enforced is:

if Policy1_(:Policy2^:Policy3^Policy4)
then Permit
else Deny

Figure 16:
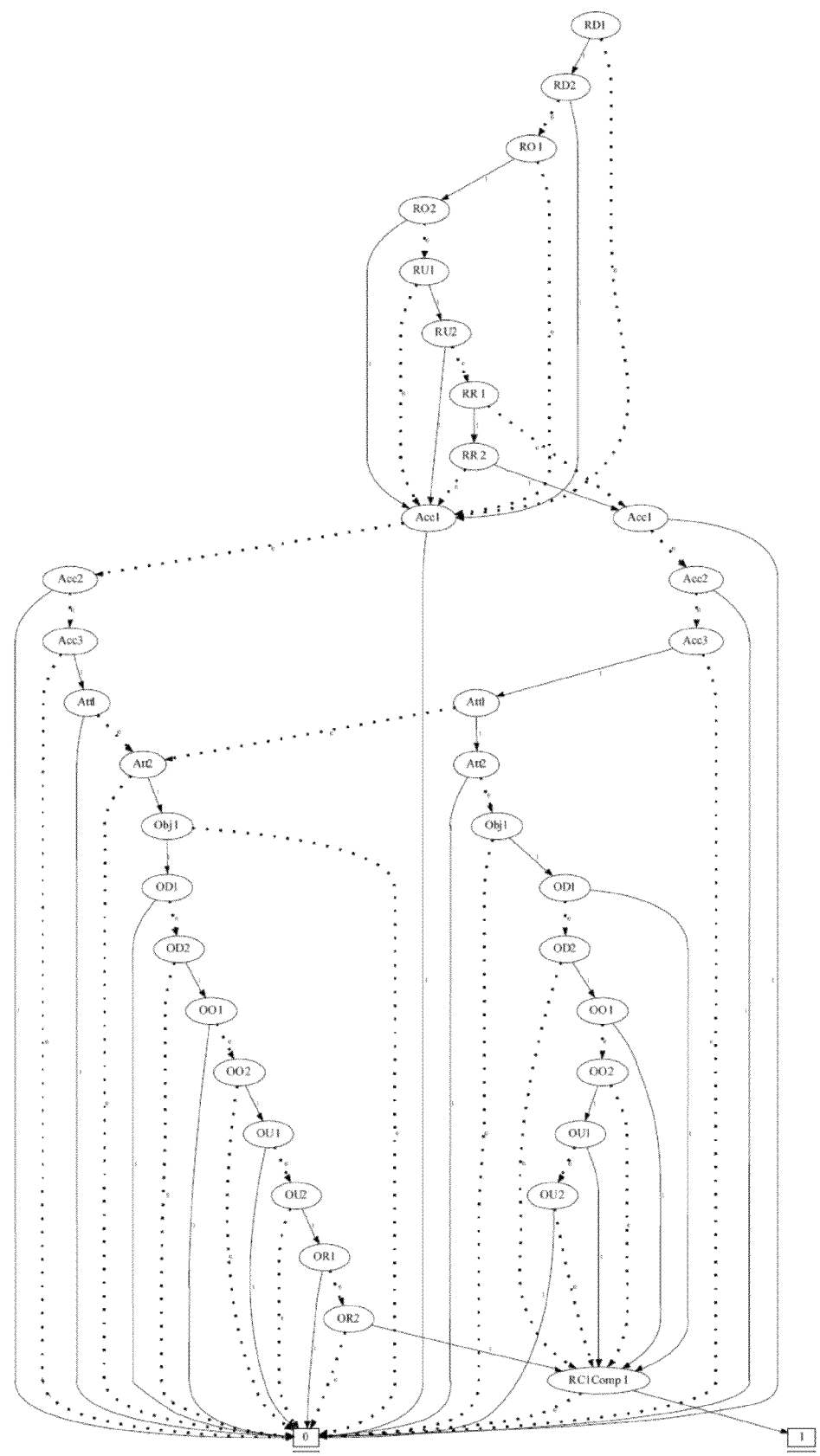
FIG. 16 shows a binary decision diagram representing the combination of the rules of FIGS. 8-15.

As shown, information can be shared if a request matches Policy1. If Policy1 is not matched, the request can only be permitted if Policy2 and Policy3 are not matched and Policy4 is matched. If no matches are found, the default policy is applied and no information is shared. Since Policy2 and Policy3 have 'deny' actions, they are prefixed with a to show that these policies must not be matched in order for information-sharing to take place. The BDD of the combined policies is illustrated in FIG. 16.

The approach of the present disclosure allows modelling of information-sharing policies using techniques derived from modelling of access-control lists in router and firewall architectures. The ability to model access-control lists with a high degree of accuracy is due to the precise syntax used to define access-control rules. A syntax to define information-sharing policies, derived from the syntax for access-control rules, was then proposed in the chapter. Using this syntax allowed information-sharing policies to be defined and, hence, modelled with the same accuracy and precision as that of access-control lists. Another advantage of the proposed syntax, besides being readily machine-readable, was that information-sharing policies were human-understandable. This allowed the intent of a policy to be understood by humans simply by reading the policy.

The framework thus described forms the basis for implementation and evaluation scenarios as detailed below.

Figure 17:
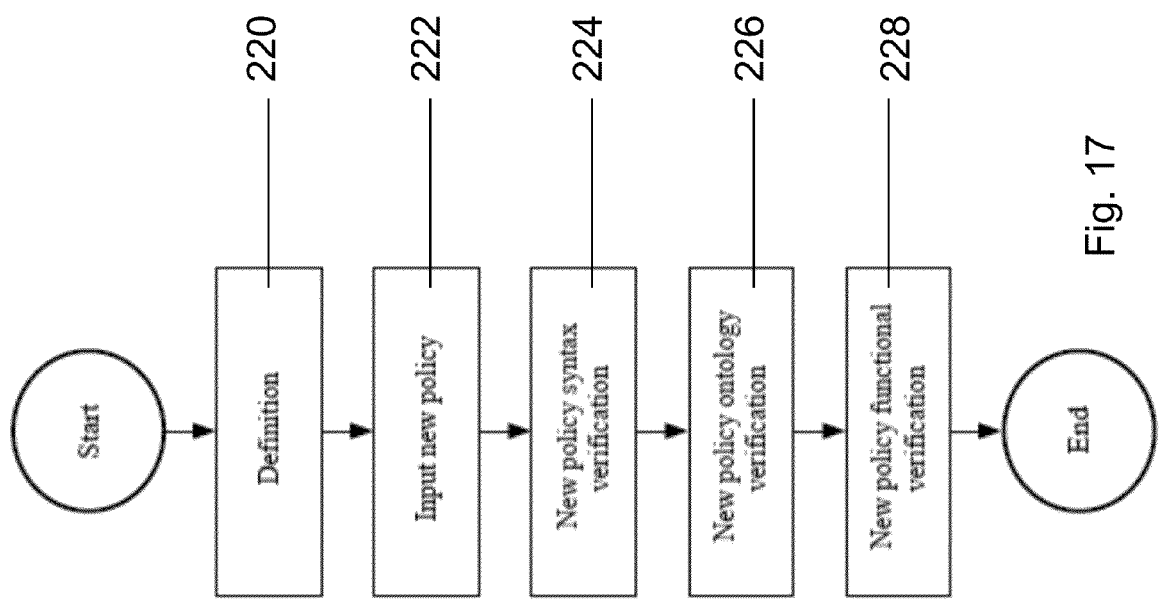
FIG. 17 illustrates a mode of operation of a policy verification framework.

The concepts described above can be used to for testing a proposed policy to verify that it is valid and can be added to an existing set of policies. The verification process may comprise the following component parts:
   Definition of policy syntax structure and declaration of policy field elements
   Syntax verification of proposed policy
   Ontology verification of proposed policy
   Functional verification of proposed policy The application of these processes is illustrated in FIG. 17, which shows the sequential steps 220 of definition of policy syntax structure, the input of a new policy at 222, the verification of the new policy syntax at 224, the ontology verification of the new policy at 226 and the functional verification of the new policy at 228. These are performed between start and end points of the verification process.

The definition stage may comprise a two-step process where the first step includes definition of the syntax to be used to describe information sharing policies and the second step includes a declaration of all possible elements which can occur as part of the fields of a policy. Thus, this stage defines the 'universe' of all possible policy fields, as well as the possible elements of each field, and forms the basis of any subsequent policy verification process. The following Example illustrates the definition process, assuming that two organisations, Police Force A and Child Protection Agency B have initiated an information sharing agreement, which includes the following policy:

The Records Admin from the Records Unit of Child Protection Agency B permits a Sergeant from the Domestic Violence Unit of Police Force A to read the Unique Identifier of a Child, whilst complying with the Human Rights Act, 1998, as long as it is for an abuse investigation and the Sergeant is the Investigating Officer.

The first step of the definition stage requires specification of the information sharing policy syntax. For the purposes of this example, information sharing policies are defined as having a nine-field syntax, where each field is enclosed within square brackets, '[' and ']' like so:
   [permission] [requester] [relationship] [action] [attribute] [object] [context] [owner] [compliance]

Once the information sharing policy syntax has been specified, it can be used to represent polices from the information sharing agreement.

For the purposes of this example, the requester and owner fields are defined as hierarchical, while the remainder of the fields are non-hierarchical. The requester and owner fields are, both, sub-divided into domain, organisation, unit and role, with a full stop '.' used to delineate between each field sub-division.

So, the example information sharing above can be expressed using the above syntax as:
[Permit] [Police.Police_Force_A.Domestic_Violence_Unit.Sergeant] with [Investigating_Officer] relationship [R] [Unique_Identifier] of [Child] with [Abuse_Investigation] context from [Social_Care.Child_Protection_Agency_B.Records_Unit.Records_Admin] with Compliance [Human_Rights_Act_1998]

The second step of the definition stage requires a declaration of all possible elements which can occur within the fields of a policy. Table 6 illustrates all possible elements from an example information sharing agreement.

TABLE 6

| Policy Field | Declared Elements |
|---|---|
| Permission | Permit |
|  | Deny |
| Domain | Social_Care |
|  | Police |
| Organisation | (Social_Care) + Child_Protection_Agency_B |
|  | (Police) + Police_Force_A |
| Unit | (Social_Care.Child_Protection_Agency_B) + Records_Unit |
|  | (Police.Police_Force_A) + Domestic_Violence_Unit |
| Role | (Social_Care.Child_Protection_Agency_B.Records_Unit) + Records_Admin |
|  | (Police.Police_Force_A.Domestic_Violence_Unit) + Sergeant |
| Relationship | Investigating_Officer |
| Action | Read |
| Attribute | Health_Record |
|  | Unique_Identifier |
| Object | Child |
| Context | Abuse_Investigation |
| Compliance | Data_Protection_Act |

In fact, elements used to define the example policy shown above have all been selected from Table 6. It must be noted that a policy field can also be defined using a wildcard such as "*". Use of a wildcard symbolises that an element has not been declared for a specific field in a policy. Further, as illustrated in Table 6, the elements of the hierarchical requester and owner fields are declared with respect to their specific higher-level fields. This means that the elements of the highest-level field, domain, would be declared by themselves. For example, in Table 6, the domains Police and Social_Care would be declared by themselves.

The elements of the organisation field, however, are declared in relation to their respective domains. For example, the organisation Police_Force_A is declared in relation to its specific domain, as Police.Police_Force_A. Similarly, the organisation Child_Protection_Agency_B is declared in relation to its specific domain, as Social_Care.Child_Protection_Agency_B. The same principle applies to the subsequent lower-level fields of unit and role.

Syntax verification is the initial stage of the policy verification process. During this stage, a proposed policy is checked to verify that it satisfies the defined syntax criteria for information sharing policies, as specified previously during the definition stage. The following Syntax Verification example illustrates the syntax verification process. If the proposed policy does not comply with this syntax structure, then the testing process is terminated, as other tests only need to be carried out if a policy meets the required syntax criteria.

This example assumes that the following information sharing policy is proposed to be added to a policy database.
[Permit] [Police.Police_Force_A.*.Sergeant] with [*] relationship [R][Unique_Identifier] of [Child] with [Abuse_Investigation] context from [Social_Care. Child_Protection_Agency_B.Records_Unit.Records_Admin] with Compliance [Human_Rights_Act_1998]

The syntax verification stage checks that the number of fields specified in the proposed policy, as well as the syntax structure of the proposed policy, correspond with the syntax and number of fields defined earlier in the definition stage, as shown above. In the case of this example, the proposed policy is parsed to extract its constituent fields, as enclosed within square brackets, '[' and ']'. This process checks that the number of fields in the proposed policy corresponds correctly with the number of fields defined earlier in the definition stage.

Further, the requester and owner fields from the proposed policy, that is fields two and eight, respectively, are checked to ensure that they correspond correctly with the hierarchical structure defined for these fields. This entails ensuring that fields two and eight contain four sub-divisions which are delineated using full stops, '.'. Since the proposed policy shown is expressed correctly using the defined syntax, the syntax verification is successful and the next stage of policy verification commences.

If the proposed policy had not complied with the defined syntax structure, then the testing process would be terminated, as other tests only need to be carried out if a policy meets the required syntax criteria.

Ontology verification is the second stage of the policy verification process, following syntax verification. During this stage, a proposed policy is checked to verify that each field of the policy statement comprises valid elements. An element is designated as valid if it has been previously declared in the definition stage. The following Ontology Verification example illustrates this process.

This example assumes a scenario where policy field elements, as shown in Table 7, are specified as part of the definition stage in an information sharing agreement.

TABLE 7

| Policy Field | Declared Elements |
|---|---|
| Permission | Permit |
|  | Deny |
| Domain | Social_Care |
|  | Police |
| Organisation | (Social_Care) + Child_Protection_Agency_B |
|  | (Police) + Police_Force_A |
| Unit | (Social_Care.Child_Protection_Agency_B) + Records_Unit |
|  | (Police.Police_Force_A) + Domestic_Violence_Unit |
| Role | (Social_Care.Child_Protection_Agency_B.Records_Unit) + Records_Admin |
|  | (Police.Police_Force_A.Domestic_Violence_Unit) + Sergeant |
| Relationship | Investigating_Officer |
| Action | Read (R) |
|  | Create (C) |
|  | Update (U) |
|  | Delete (D) |
| Attribute | Health_Record |
|  | Unique_Identifier |
| Object | Child |
| Context | Abuse_Investigation |
| Compliance | Data_Protection_Act |

Four information sharing policies, Rw, Rx, Ry and Rz, are proposed to be added to an existing set of policies. These proposed policies are as follows:
Rw:
[Permit] [Police.Police_Force_A.Domestic_violence_Unit.Sergeant] with [*] relationship [R] [Unique_Identifier] of [Child] with [Abuse_Investigation] context from [Social_Care.Child_Protection_Agency_B.Records_Unit.Records_Admin] with Compliance [Human_Rights_Act_1998]
Rx:
[Permit] [Police.Police_Force_A.Domestic_violence_Unit.*] with [*] relationship [R] [Unique_Identifier] of [Child] with [Abuse_Investigation] context from [Social_Care.Child_Protection_Agency_B.Records_Unit.Records_Admin] with Compliance [Human_Rights_Act_1998]

Ry:
[Permit] [Police.Police_Force_A.Domestic_violence_Unit.Constable] with [*] relationship [R] [Unique_Identifier] of [Child] with [Abuse_Investigation] context from [Social_Care.Child_Protection_Agency_B.Records_Unit.Records_Admin] with Compliance [Human_Rights_Act_1998]

Rz:
[Permit] [Police.Police_Force_A.Domestic_violence_Unit.Records_Admin] with [*] relationship [R] [Unique_Identifier] of [Child] with [Abuse_Investigation] context from [Social_Care.Child_Protection_Agency_B.Records_Unit.Records_Admin] with Compliance [Human_Rights_Act_1998]

The initial step of the ontology verification stage comprises parsing of the proposed policies in order to extract their constituent field elements, as enclosed within square brackets, '[' and ']'. Table 8 shows field elements extracted from the example proposed policies.

for policy Rw, the ontology verification process is successful and the next stage of verification can commence.

Similar to policy Rw, each element in the proposed policy, Rx, also exists as a valid declared element, in its respective declared field. Since Rx shows the Requester_Role element as the wildcard '*', this field is not checked against the respective field in the definition and, hence, the ontology verification process for policy Rx is also successful.

In the case of policy Ry, however, the element for the Requester_Role field is shown as Constable. Since Constable is not a defined element for the Requester_Role field, and, hence, does not appear as a defined element in the column in Table 7, policy Ry will fail the ontology verification stage.

In the case of policy Rz, although the Requester_Role field, shown as Records_Admin, exists as a declared element in the definitions in Table 7, it does not belong to the Police.Police_Force_A.Domestic_violence_Unit hierarchy. Therefore, policy Rz will also fail the ontology verification stage.

TABLE 8

| Policy Field | Elements of Policy $R_w$ | Elements of Policy $R_x$ | Elements of Policy $R_y$ | Elements of Policy $R_z$ |
|---|---|---|---|---|
| Permission | Permit | Permit | Permit | Permit |
| RD | Police | Police | Police | Police |
| RO | (Police) + PFA | (Police) + PFA | (Police) + PFA | (Police) + PFA |
| RU | (Police) + (PFA) + DVU | (Police) + (PFA) + DVU | (Police) + (PFA) + DVU | (Police) + (PFA) + DVU |
| RR | (Police) + (PFA) + (DVU) + Sergeant | (Police) + (PFA) + (DVU) + * | (Police) + (PFA) + (DVU) + Constable | (Police) + (PFA) + (DVU) + RA |
| Relationship | * | * | * | * |
| Action | R | R | R | R |
| Attribute | Unique Identifier | Unique Identifier | Unique Identifier | Unique Identifier |
| Object | Child | Child | Child | Child |
| Context | Abuse Investigation | Abuse Investigation | Abuse Investigation | Abuse Investigation |
| OD | SC | SC | SC | SC |
| OO | (SC) + CPAB | (SC) + CPAB | (SC) + CPAB | (SC) + CPAB |
| OU | (SC) + (CPAB) + RU | (SC) + (CPAB) + RU | (SC) + (CPAB) + RU | (SC) + (CPAB) + RU |
| OR | (SC) + (CPAB) + (RU) + RA | (SC) + (CPAB) + (RU) + RA | (SC) + (CPAB) + (RU) + RA | (SC) + (CPAB) + (RU) + RA |
| Compliance | Data Protection Act | Data Ptotection Act | Data Protection Act | Data Protection Act |

| Field or Element | Abbreviation |
|---|---|
| Requester/Owner Domain | RD/OD |
| Requester/Owner Organisation | RO/OO |
| Requester/Owner Unit | RU/OU |
| Requester/Owner Role | RR/OR |
| Police_Force_A | PFA |
| Domestic_Violence_Unit | DVU |
| Social_Care | SC |
| Child_Protection_Agency_B | CPAB |
| Records_Unit | RU |
| Records_Admin | RA |
| Data_Protection_Act | DPA |

It must be noted here that where the '*' wildcard is used instead of a field element the corresponding field is not checked for against an entry in the definition. Comparison between elements of the proposed policies, as shown in Table 8, and the declared elements shown in Table 7 illustrates that each element in the proposed policy, Rw, exists as a valid declared element, in its respective declared field. Therefore, In the case where a policy fails the ontology verification stage, the testing process would be terminated as other tests only need to be carried out if a policy meets the required ontology criteria.

Figure 18:
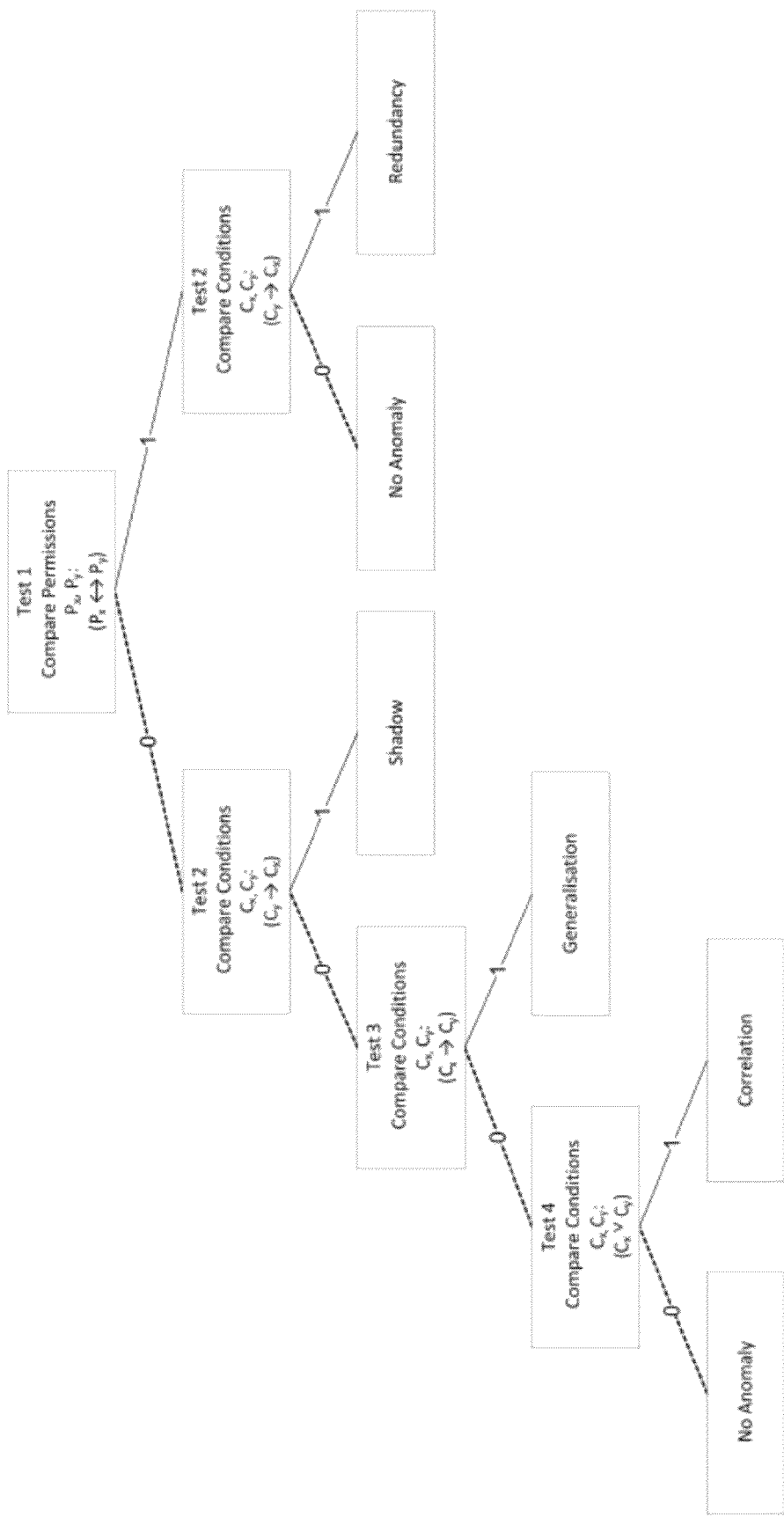
FIG. 18 illustrates an anomaly classification method for functional verification of an information sharing policy.

The functional verification stage is the final stage of the policy verification process and identifies any potential anomalies which may exist between a proposed policy and those present in an existing set of policies. This stage uses anomaly definitions of redundancy, shadowing, generalisation and correlation. Therefore, functional verification is split into four stages, each to check for a specific category of anomaly. A representation of an anomaly classification method is shown in FIG. 18. As indicated, anomalies are detected by logically comparing the permissions, Px and Py, and conditions, Cx and Cy, for any two policies, Rx and Ry.

The comparison process, with respect to anomaly detection, entails identification of a subset, superset or equivalence relation between respective fields of the policies, Rx and Ry, which is achieved by carrying out bitwise logical operations between comparative fields. When operating on non-hierarchical fields, the operation simply entails using the entire field in the comparison. For hierarchical fields, however, this entails definition of the fields as logical conjunctions (^), of all of their sub-fields. The logical operation is then performed for the entire hierarchical field. For example, the Requester and Owner fields can both be defined as logical conjunctions of their constituent Domain, Organisation, Unit and Role sub-fields:

$Requester_x$, $Owner_x$: $Domain_x$^$Organization_x$^$Unit_x$^$Role_x$
$Requester_y$, $Owner_y$: $Domain_y$^$Organization_y$^$Unit_y$^$Role_y$ The logical comparisons are carried out using Binary Decision Diagrams (BDDs). The logical 'AND' operation, or conjunction (^), is used to identify subset, superset or equivalence relations, which allows a generic method of illustrating logical relationships which is independent of the internal computations of any specific Binary Decision Diagram (BDD) software package.

Since BDDs perform bitwise logical operations, the permissions, $P_x$ and $P_y$, and conditions, $C_x$ and $C_y$, of policies $R_x$ and $R_y$, must first be represented in binary bits. However, unlike modelling firewall rules and access lists, information sharing policies can have fields of varying lengths. This is due to the fact that there is no limit on the number of possible elements which may be declared as part of a field in an information sharing agreement.

In order to avoid having to restrict the number or length of fields of an information sharing policy that can be modelled, and since the number of possible elements in a field can vary, it is possible in a preferred embodiment to adjust each field for the appropriate number of bits before performing any bitwise operations on it, The adjustment process entails assigning an element identifier, Element ID, to each element in a field and then representing the element identifier in binary form. Hence, the total number of binary variables needed to represent a field element is dependent on the total number of possible field elements declared during the definition stage.

Table 9 illustrates the assignment of Element IDs to elements from Table 7, from the Ontology Verification Example above, and their binary representations.

An example information sharing policy with field elements populated from elements defined in Table 9 might look like:
Rx: [Permit] [Police.Police_Force_A.Domestic_Violence_Unit. Sergeant] with [Investigating_Officer] relationship [R] [Health_Record] of [Child] with [Abuse_Investigation] context from [Social_Care.Child_Protection_Agency_B. Records_Unit. Records_Admin] with Compliance [Data_Protection_Act]

A binary representation of this example policy would be:
Rx: [1] [10.10.10] [1] [001] [01] [1] [1] [01.01.01] [1]

This binary representation shows that an information sharing policy populated from elements defined in Table 9 will consist of 26 binary bits. If, however, the Role field is now updated to include two additional roles, Constable and Analyst, the number of bits required to represent the policy will change. Table 10 shows the Role field from Table 9 updated with the additional roles.

TABLE 10

| Policy Field | Elements from Definition | Element ID | Binary Representation |
| --- | --- | --- | --- |
| Role | Records Admin | 1 | 001 |
| | Sergeant | 2 | 010 |
| | Constable | 3 | 011 |
| | Analyst | 4 | 100 |

The same information sharing policy, Rx from the listing above (with field elements populated from elements defined in Table 9) will have the following binary form:
Rx: [1] [10.10.10.010] [1] [001] [01] [1] [1] [01.01.01.001] [1]

As shown, 28 binary bits are now required to represent Rx whereas previously only 26 binary bits were required. This illustrates the sensitivity of binary expressions and, hence, any binary calculations, to modifications made to the set of elements registered for an information-sharing agreement.

The following examples provide details on each stage of the functional verification process. The methods used for functional verification are as illustrated in FIG. 18. Each example assumes an information sharing agreement between two organisations, Police Force A and Child Protection Agency B. Only the requester and owner fields are manipulated in the following anomaly verification examples for reasons of brevity.

Example of Redundancy Anomaly Verification

Elements from Table 9 are used to define two information sharing policies.

Rx is an existing policy in the agreement:
Rx: [Permit] [Police.Police_Force_A.Domestic_Violence_Unit.*] with [*] relationship [R] [*] of [Child] with [*] context from [Social_Care.Child_Protection_Agency_B. Records_Unit.*] with Compliance [*]

Ry is a proposed policy to be added.
Ry: [Permit] [Police.Police_Force_A.Domestic_Violence_Unit.Sergeant] with [*] relationship [R] [*] of [Child] with [*] context from [Social_Care.Child_Protection_Agency_B. Records_Unit.*] with Compliance [*]

The binary representations of the two policies are:
Rx: [1] [10.10.10.*] with [*] relationship [R] [*] of [1] with [*] context from [01.01.01.*] with Compliance [*] Ry: [1] [10.10.10.10] with [*] relationship [R] [*] of [1] with [*] context from [01.01.01.*] with Compliance [*]

Test 1: As illustrated in FIG. 18, the first comparison in the functional verification stage, Test 1, is to compare the permissions, $P_x$ and $P_y$, from policies $R_x$ and $R_y$ to check if they are the same. This operation is illustrated in the computation below using the logical relationship that if the permissions Px and Py are the same, $(P_x \Leftrightarrow P_y)$ is TRUE, then the expression $((Px^\wedge P_y) \vee (\neg P_x^\wedge \neg P_y))$ must also be TRUE.

$$P_x \quad : \quad 1$$
$$P_y \quad : \quad 1$$
$$(P_x \Leftrightarrow P_y) \quad : \quad ((P_x \wedge P_y) \vee (\neg P_x \wedge \neg P_y))$$
$$: \quad ((1 \wedge 1) \vee (\neg 1 \wedge \neg 1))$$
$$\therefore (P_x \Leftrightarrow P_y) \quad : \quad \text{TRUE}$$

Test 2: Since $P_x$ and $P_y$ are the same, the next comparison in the functional verification stage, Test 2, is to compare the conditions, $C_x$ and $C_y$, to check if $(C_y \Rightarrow C_x)$ is TRUE. This test, if TRUE, indicates that $C_y$ is either equal to, or a subset of, $C_x$ which means that policy $R_y$ is redundant to policy $R_x$. This operation is illustrated in the computation below using the logical relationship that if condition $C_y$ implies condition $C_x$, $(C_y \Rightarrow C_x)$ is TRUE, then the expression $(\neg C_y \vee C_x)$ must also be TRUE.

| | | |
|---|---|---|
| $C_x$ | : | 10.10.10.XX |
| $C_y$ | : | 10.10.10.10 |
| $C_y \Rightarrow C_x$ | : | $\neg C_y \vee C_x$ |
| | : | 01.01.01.01 ∨ 10.10.10.XX |
| $\therefore C_y \Rightarrow C_x$ | : | TRUE |

As can be seen from FIG. 18, if Test 1 and Test 2 result in TRUE, policy $R_y$ is redundant to policy $R_x$.
Example of Shadow Anomaly Verification
Elements from Table 9 are used to define two information sharing policies.
$R_x$ is an existing policy in the agreement:
Rx: [Deny] [Police.Police_Force_A.Domestic_Violence_Unit.*] with [*] relationship [R] [*] of [Child] with [*] context from [Social_Care.Child_Protection_Agency_B. Records_Unit.*] with Compliance [*]
$R_y$ is a proposed policy to be added:
Ry: [Permit] [Police.Police_Force_A.Domestic_Violence_Unit.Sergeant] with [*] relationship [R] [*] of [Child] with [*] context from [Social_Care.Child_Protection_Agency_B. Records_Unit.*] with Compliance [*]
The binary representations of the two policies is:
Rx: [0] [10.10.10.*] with [*] relationship [R] [*] of [1] with [*] context from [01.01.01.*] with Compliance [*] Ry: [1] [10.10.10.10] with [*] relationship [R] [*] of [1] with [*] context from [01.01.01.*] with Compliance [*]
Test 1: As illustrated in FIG. 18, the first comparison in the functional verification stage, Test 1, is to compare the permissions, $P_x$ and $P_y$, from policies $R_x$ and $R_y$ to check if they are the same. This operation is illustrated in the computation below using the logical relationship that if the permissions $P_x$ and $P_y$ are the same, $(Px \Leftrightarrow Py)$ is TRUE, then the expression $((P_x \hat{\ } P_y) \vee (\neg Px \hat{\ } \neg Py))$ must also be TRUE.

| | | |
|---|---|---|
| $P_x$ | : | 0 |
| $P_y$ | : | 1 |
| $(P_x \Leftrightarrow P_y)$ | : | $((P_x \wedge P_y) \vee (\neg P_x \wedge \neg P_y))$ |
| | : | $((0 \wedge 1) \vee (\neg 0 \wedge \neg 1))$ |
| $\therefore (P_x \Leftrightarrow P_y)$ | : | FALSE |

Test 2: Since $P_x$ and $P_y$ are different, the next comparison in the functional verification stage, Test 2, is to compare the conditions, $C_x$ and $C_y$, to check if $(C_y \Rightarrow Cx)$ is TRUE. This test, if TRUE, indicates that $C_y$ is either equal to, or a subset of, $C_x$ which means that policy $R_y$ is shadowed by policy $R_x$. This operation is illustrated in the computation below using the logical relationship that if condition $C_y$ implies condition $C_x$, $(Cy \Rightarrow Cx)$ is TRUE, then the expression $(\neg C_y \vee C_x)$ must also be TRUE.

| | | |
|---|---|---|
| $C_x$ | : | 10.10.10.XX |
| $C_y$ | : | 10.10.10.10 |
| $C_y \Rightarrow C_x$ | : | $\neg C_y \vee C_x$ |
| | : | 01.01.01.01 ∨ 10.10.10.XX |
| $\therefore C_y \Rightarrow C_x$ | : | TRUE |

As can be seen from FIG. 18, if Test 1 results in FALSE and Test 2 results in TRUE, policy $R_y$ is shadowed by policy $R_x$.
Example of Generalisation Anomaly Verification
Elements from Table 9 are used to define two information sharing policies.
$R_x$ is an existing policy in the agreement.
Rx: [Deny] [Police.Police_Force_A.Domestic_Violence_Unit. Sergeant] with [*] relationship [R] [*] of [Child] with [*] context from [Social_Care.Child_Protection_Agency_B. Records_Unit.*] with Compliance [*]
$R_y$ is a proposed policy to be added.
Ry: [Permit] [Police.Police_Force_A.Domestic_Violence_Unit.*] with [*] relationship [R] [*] of [Child] with [*] context from [Social_Care.Child_Protection_Agency_B. Records_Unit.*] with Compliance [*]
The binary representations of the two policies is:
Rx: [0] [10.10.10.10] with [*] relationship [R] [*] of [1] with [*] context from [01.01.01.*] with Compliance [*] Ry: [1] [10.10.10.*] with [*] relationship [R] [*] of [1] with [*] context from [01.01.01.*] with Compliance [*]
Test 1: As illustrated in FIG. 18, the first comparison in the functional verification stage, Test 1, is to compare the permissions, $P_x$ and $P_y$, from policies $R_x$ and $R_y$ to check if they are the same. This operation is illustrated in the computation below using the logical relationship that if the permissions $P_x$ and $P_y$ are the same, $(P_x \Leftrightarrow P_y)$ is TRUE, then the expression $((P_x \hat{\ } P_y) \vee (\neg P_x \hat{\ } \neg P_y))$ must also be TRUE.

| | | |
|---|---|---|
| $P_x$ | : | 0 |
| $P_y$ | : | 1 |
| $(P_x \Leftrightarrow P_y)$ | : | $((P_x \wedge P_y) \vee (\neg P_x \wedge \neg P_y))$ |
| | : | $((0 \wedge 1) \vee (\neg 0 \wedge \neg 1))$ |
| $\therefore (P_x \Leftrightarrow P_y)$ | : | FALSE |

Test 2: Since $P_x$ and $P_y$ are different, the next comparison in the functional verification stage, Test 2, is to compare the conditions, $C_x$ and $C_y$, to check if $(C_y \Rightarrow C_x)$ is TRUE. This test, if TRUE, indicates that $C_y$ is either equal to, or a subset of, $C_x$ which means that policy $R_y$ is shadowed by policy $R_x$. This operation is illustrated in the computation below using the logical relationship that if condition $C_y$ implies condition $C_x$, $(C_y \Rightarrow C_x)$ is TRUE, then the expression $(\neg C_y \vee C_x)$ must also be TRUE.

| | | |
|---|---|---|
| $C_x$ | : | 10.10.10.10 |
| $C_y$ | : | 10.10.10.XX |
| $C_y \Rightarrow C_x$ | : | $\neg C_y \vee C_x$ |
| | : | 01.01.01.00 ∨ 10.10.10.10 |
| $\therefore C_y \Rightarrow C_x$ | : | FALSE |

Test 3: Since the result of Test 2 is FALSE, the next comparison in the functional verification stage, Test 3, is to compare the conditions, $C_x$ and $C_y$, to check if $(C_x \Rightarrow C_y)$ is TRUE. This test, if TRUE, indicates that $C_x$ is either equal to, or a subset of, $C_y$ which means that policy $R_y$ is a generalisation of policy $R_x$. This operation is illustrated in the computation below using the logical relationship that if condition $C_x$ implies condition $C_y$, $(C_x \Rightarrow C_y)$ is TRUE, then the expression $(\neg C_x \vee C_y)$ must also be TRUE.

$$C_x : 10.10.10.10$$
$$C_y : 10.10.10.XX$$
$$C_x \Rightarrow C_y : \neg C_x \vee C_y$$
$$: 01.01.01.01 \vee 10.10.10.11$$
$$\therefore C_y \Rightarrow C_x : \text{TRUE}$$

As can be seen from FIG. 18, if Test 1 results in FALSE, Test 2 results in FALSE and Test 3 results in TRUE, policy $R_y$ is a generalisation of policy $R_x$.

Example of Correlation Anomaly Verification

Elements from Table 9 are used to define two information sharing policies.

$R_x$ is an existing policy in the agreement:
Rx: [Deny] [Police.Police_Force_A.Domestic_Violence_Unit. Sergeant] with [*] relationship [R] [*] of [Child] with [*] context from [Social_Care.Child_Protection_Agency_B. Records_Unit.*] with Compliance [*]

$R_y$ is a proposed policy to be added:
Ry: [Permit] [Police.Police_Force_A.Domestic_Violence_Unit.*] with [*] relationship [R] [*] of [Child] with [*] context from [Social_Care.Child_Protection_Agency_B. Records_Unit.Records_Admin] with Compliance [*]

The binary representations of the two policies is:
Rx: [0] [10.10.10.10] with [*] relationship [R] [*] of [1] with [*] context from [01.01.01.*] with Compliance [*] Ry: [1] [10.10.10.*] with [*] relationship [R] [*] of [1] with [*] context from [01.01.01.01] with Compliance [*]

It must be noted that, unlike in previous examples, in this example the conditions $C_x$ and $C_y$ of policies $R_x$ and $R_y$ have different Requester and Owner fields. Therefore, the conjunction of both these fields will be used in the tests below when comparing conditions.

Test 1: As illustrated in FIG. 18, the first comparison in the functional verification stage, Test 1, is to compare the permissions, $P_x$ and $P_y$, from policies $R_x$ and $R_y$ to check if they are the same. This operation is illustrated in the computation below using the logical relationship that if the permissions $P_x$ and $P_y$ are the same, $(Px \Leftrightarrow Py)$ is TRUE, then the expression $((P_x \wedge P_y) \vee (\neg P_x \wedge \neg P_y))$ must also be TRUE.

$$P_x : 0$$
$$P_y : 1$$
$$(P_x \Leftrightarrow P_y) : ((P_x \wedge P_y) \vee (\neg P_x \wedge \neg P_y))$$
$$: ((0 \wedge 1) \vee (\neg 0 \wedge \neg 1))$$
$$\therefore (P_x \Leftrightarrow P_y) : \text{FALSE}$$

Test 2: Since $P_x$ and $P_y$ are different, the next comparison in the functional verification stage, Test 2, is to compare the conditions, $C_x$ and $C_y$, to check if $(C_y \Rightarrow C_x)$ is TRUE. This test, if TRUE, indicates that $C_y$ is either equal to, or a subset of, $C_x$ which means that policy Ry is shadowed by policy $R_x$. This operation is illustrated in the computation below using the logical relationship that if condition $C_y$ implies condition $C_x$, $(C_y \Rightarrow C_x)$ is TRUE, then the expression $(\neg C_y \vee C_x)$ must also be TRUE.

| | | Requester Field | Owner Field |
|---|---|---|---|
| $C_x$ | : | 10.10.10.10 | 01.01.01.XX |
| $C_y$ | : | 10.10.10.XX | 01.01.01.01 |
| $C_y \Rightarrow C_x$ | : | $\neg C_y \vee C_x$ | $\neg C_y \vee C_x$ |
| | : | 01.01.01.00 ∨ 10.10.10.10 | 10.10.10.10 ∨ 01.01.01.11 |
| | : | FALSE | TRUE |
| $\therefore C_y \Rightarrow C_x$ | : | | FALSE |

Test 3: Since the result of Test 2 is FALSE, the next comparison in the functional verification stage, Test 3, is to compare the conditions, $C_x$ and $C_y$, to check if $(C_x \Rightarrow C_y)$ is TRUE. This test, if TRUE, indicates that $C_x$ is either equal to, or a subset of, $C_y$ which means that policy $R_y$ is a generalisation of policy $R_x$. This operation is illustrated in the computation below using the logical relationship that if condition $C_x$ implies condition $C_y$, $(C_x \Rightarrow C_y)$ is TRUE, then the expression $(\neg C_x \vee C_y)$ must also be TRUE.

| | | Requester Field | Owner Field |
|---|---|---|---|
| $C_x$ | : | 10.10.10.10 | 01.01.01.XX |
| $C_y$ | : | 10.10.10.XX | 01.01.01.01 |
| $C_x \Rightarrow C_y$ | : | $\neg C_x \vee C_y$ | $\neg C_x \vee C_y$ |
| | : | 01.01.01.01 ∨ 10.10.10.11 | 10.10.10.00 ∨ 01.01.01.01 |
| | : | TRUE | FALSE |
| $\therefore C_x \Rightarrow C_y$ | : | | FALSE |

Test 4: Since the result of Test 3 is FALSE, the next comparison in the functional verification stage, Test 4, is to compare the conditions, $C_x$ and $C_y$, to check for correlated fields. For this example, this requires checking that the Requester and Owner fields of one policy are the same as, or subsets of, the corresponding fields of the other policy and that the remaining fields of the former policy are supersets of the corresponding fields of the latter policy. Formally, this means that for the fields being compared, if for certain fields $(C_x \Rightarrow C_y)$ is TRUE, then $(C_y \Rightarrow C_x)$ must be TRUE for the remaining fields being compared. This operation is illustrated in the computation below using the logical relationship that if condition $C_x$ implies condition $C_y$, $(C_x \Rightarrow C_y)$ is TRUE, then the expression $(\Rightarrow C_x \vee C_y)$ must also be TRUE.

|  | Requester Field | Owner Field |
|---|---|---|
| $C_x$ : | 10.10.10.10 | 01.01.01.$XX$ |
| $C_y$ : | 10.10.10.$XX$ | 01.01.01.01 |
| $Requester_x \Rightarrow Requester_y$ : | $\neg Requester_x \lor Requester_y$ | |
| : | 01.01.01.01 ∨ 10.10.10.11 | |
| : | TRUE | |
| $Owner_y \Rightarrow Owner_x$ : | | $\neg Owner_y \lor Owner_x$ |
| : | | 10.10.10.10 ∨ 01.01.01.11 |
| : | | TRUE |
| ∴ $Requester_x \Rightarrow Requester_y$ | | |
| $\land Owner_y \Rightarrow Owner_x$ : | TRUE | |

As can be seen from FIG. 18, if Test 1 results in FALSE, Test 2 results in FALSE, Test 3 results in FALSE and Test 4 results in TRUE, policies $R_x$ and $R_y$ are correlated.

The invention claimed is:

1. A method of validating a proposed information sharing policy for managing the sharing of information between a requester organization and an information owner organization based at least in part on information held by the information owner organization and an identity of an agent of the requester organization as defined by one or more Boolean functions modelled as binary decision diagrams that define permitted access to particular types of information, the method comprising:
   receiving, by a hardware processor of a computing device, a definition of a syntax for the proposed information sharing policy, said definition comprising:
      a definition of a policy syntax structure used to describe the proposed information sharing policy, and
      identification of all possible elements which can occur as part of the fields of the proposed information sharing policy;
   verifying, by the hardware processor, the syntax of the proposed information sharing policy, said syntax verification comprising determining the proposed information sharing policy satisfies the definition of the policy syntax structure;
   verifying, by the hardware processor, the ontology of the proposed information sharing policy, said ontology verification comprising determining each field of the proposed information sharing policy comprises one or more valid elements; and
   verifying, by the hardware processor, functionality of the proposed information sharing policy.

2. The method of claim 1, wherein the identity of the agent of the requester organization comprises a role of the agent within an organizational hierarchy of the requester organization.

3. The method of claim 1, wherein sharing information between the request organization and the information owner organization is based at least in part on a role of the agent of the information owner organization.

4. The method of claim 1, wherein the Boolean functions are modelled as reduced-order binary decision diagrams.

5. The method of claim 1, wherein fields of the proposed information sharing policy are translated to bit sequences for forming Boolean vectors for representation as said binary decision diagrams.

6. The method of claim 1, wherein fields of the proposed information sharing policy are defined using a restricted natural language syntax.

7. The method of claim 6, wherein element identifiers are assigned to each element in each field.

8. A system for validating a proposed information sharing policy for managing the sharing of information between a requester organization and an information owner organization based at least in part on information held by the information owner organization and the identity of an agent of the requester organization as defined by one or more Boolean functions modelled as binary decision diagrams that define permitted access to particular types of information, the system comprising:
   a hardware processor; and
   a memory storing instructions thereon that, when executed by a hardware processor, cause the hardware processor to:
   receive a definition of a syntax for the proposed information sharing policy, said definition comprising:
      a definition of a policy syntax structure used to describe the proposed information sharing policy, and
      identification of all possible elements which can occur as part of the fields of the proposed information sharing policy;
   verify the syntax of the proposed information sharing policy, said syntax verification comprising determining the proposed information sharing policy satisfies the definition of the policy syntax structure;
   verify the ontology of the proposed information sharing policy, said ontology verification comprising determining each field of the proposed information sharing policy comprises one or more valid elements; and
   verify functionality of the proposed information sharing policy.

9. The system of claim 8, wherein the identity of an agent of the requester organization comprises a role of the agent within an organizational hierarchy of the requester organization.

10. The system of claim 8, wherein sharing information between the request organization and the information owner organization is based at least in part on a role of an agent of the information owner organization.

11. The system of claim 8, wherein the Boolean functions are modelled as reduced-order binary decision diagrams.

12. The system of claim 8, wherein fields of the proposed information sharing policy are translated to bit sequences for forming Boolean vectors for representation as said binary decision diagrams.

13. The system of claim 8, wherein fields of the proposed information sharing policy are defined using a restricted natural language syntax.

14. The system of claim 13, wherein element identifiers are assigned to each element in each field.

15. The system of claim 8, wherein verifying functionality of the proposed information sharing policy comprises:
   identifying potential anomalies that exist between the proposed information sharing policy and one or more existing information sharing policies.

16. The method of claim 1, wherein verifying functionality of the proposed information sharing policy comprises:
   identifying potential anomalies that exist between the proposed information sharing policy and one or more existing information sharing policies.

* * * * *